United States Patent
Yamagishi et al.

(10) Patent No.: US 10,275,869 B2
(45) Date of Patent: Apr. 30, 2019

(54) INSPECTION RESULT RETRIEVAL DEVICE AND METHOD

(71) Applicant: FUJIFILM Corporation, Tokyo (JP)

(72) Inventors: Hideki Yamagishi, Tokyo (JP); Satoshi Kubota, Tokyo (JP); Masayuki Negoro, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/902,943

(22) Filed: Feb. 22, 2018

(65) Prior Publication Data

US 2018/0182090 A1 Jun. 28, 2018

Related U.S. Application Data

(63) Continuation of application No. PCT/JP2016/074894, filed on Aug. 26, 2016.

(30) Foreign Application Priority Data

Sep. 29, 2015 (JP) ................................. 2015-191074

(51) Int. Cl.
*G06K 9/00* (2006.01)
*G06T 7/00* (2017.01)
(Continued)

(52) U.S. Cl.
CPC .......... *G06T 7/0004* (2013.01); *G05B 19/042* (2013.01); *G06F 17/30997* (2013.01);
(Continued)

(58) Field of Classification Search
None
See application file for complete search history.

(56) References Cited

U.S. PATENT DOCUMENTS 8,300,986 B2* 10/2012 Kochi ................... G06T 3/4038
382/294
8,660,368 B2* 2/2014 Datta ................... G06K 9/00778
382/103
(Continued)

FOREIGN PATENT DOCUMENTS

JP 2005-227829 A 8/2005
JP 2006-338312 A 12/2006
(Continued)

OTHER PUBLICATIONS

International Search Report issued in PCT/JP2016/074894; dated Oct. 4, 2016.
(Continued)

*Primary Examiner* — Soo Jin Park
(74) *Attorney, Agent, or Firm* — Studebaker & Brackett PC

(57) ABSTRACT

A first inspection result regarding a construction is obtained, the first inspection result including a usage condition and a locational and environmental condition of the construction and an inspection image. An image feature of the inspection image is obtained from the first inspection result, the image feature including a damage feature. One or more second inspection results corresponding to one of the image feature or a construction condition that includes at least one of the usage condition or the locational and environmental condition are retrieved. A display unit displays the retrieved one or more second inspection results. One or more specific inspection results that correspond to the other of the image feature or the construction condition are retrieved from among the retrieved one or more second inspection results. The display unit displays the one or more specific inspection results preferentially over the other inspection results among the second inspection results.

13 Claims, 18 Drawing Sheets

(51) Int. Cl.
　　*G06F 17/30* (2006.01)
　　*G05B 19/042* (2006.01)
　　*E01D 22/00* (2006.01)

(52) U.S. Cl.
　　CPC ............... *G06T 7/001* (2013.01); *G06T 7/97* (2017.01); *E01D 22/00* (2013.01); *G06T 2207/10016* (2013.01); *G06T 2207/30132* (2013.01)

(56) References Cited

U.S. PATENT DOCUMENTS

| | | | | |
|---|---|---|---|---|
| 9,082,015 | B2* | 7/2015 | Christopulos | G06K 9/00637 |
| 2016/0292518 | A1* | 10/2016 | Banitt | G06K 9/00805 |
| 2018/0156736 | A1* | 6/2018 | Kondo | G01N 21/8851 |

FOREIGN PATENT DOCUMENTS

| | | |
|---|---|---|
| JP | 2012-225889 A | 11/2012 |
| JP | 2015-095143 A | 5/2015 |
| JP | 2015095143 A * | 5/2015 |

OTHER PUBLICATIONS

Written Opinion issued in PCT/JP2016/074894; dated Oct. 4, 2016.
International Preliminary Report on Patentability issued in PCT/JP2016/074894; dated Apr. 3, 2018.
Kawamura et al.; "Development and Practical Use of Bridge Maintenance and Management Assistance Database System for Yamaguchi Prefecture", pp. 3 to 4, [online], [retrieved on Aug. 31, 2015], the Internet <https://www.cgr.mlit.go.jp/ctc/tech_dev/kouryu/T-Space/ronbun/pdf/22_yamaguti/22_yamaguti_3-1.pdf>.
Ishikawa; "Infrastructure Management using ICT, Collection and Analysis of Information regarding Maintenance and Management of Roads, Bridges, Public Facilities, etc.", p. 13, [online], [retrieved on Aug. 31, 2015], the Internet <http://download.microsoft.com/download/F/D/7/FD769695-8B4C-4E56-9F18-5E3991B6B3AB/a3.pdf>.

* cited by examiner

FIG. 3

DATABASE 15

| INSPECTION DATE AND TIME | CONSTRUCTION INFORMATION | | SECOND INSPECTION RESULTS 17 | | | | | | DAMAGE | | IMAGE |
|---|---|---|---|---|---|---|---|---|---|---|---|
| | | | USAGE CONDITIONS | | LOCATIONAL AND ENVIRONMENTAL CONDITIONS | | | | | | |
| | ID | POSITION | SCATTERING OF SNOW-MELTING AGENT | VOLUME OF TRAFFIC | DISTANCE FROM SEA | TEMPERATURE | OCCURRENCE OF FREEZING | | TYPE | ASSESSMENT | |
| 2011... | abcd... | COORDINATES P1 | YES | 10000 VEHICLES | 1 km | 10° | YES | | CRACK | CATEGORY 2 | ☐ |
| 2013... | aacd... | COORDINATES P2 | NO | 2000 VEHICLES | 0.5 km | 25° | NO | | CORROSION | CATEGORY 1 | ☐ |
| 1999... | abbd... | COORDINATES P3 | YES | 5000 VEHICLES | 3 km | 17° | YES | | CRACK | CATEGORY 3 | ☐ |
| ... | ... | ... | ... | ... | ... | ... | ... | | ... | ... | ... |

27

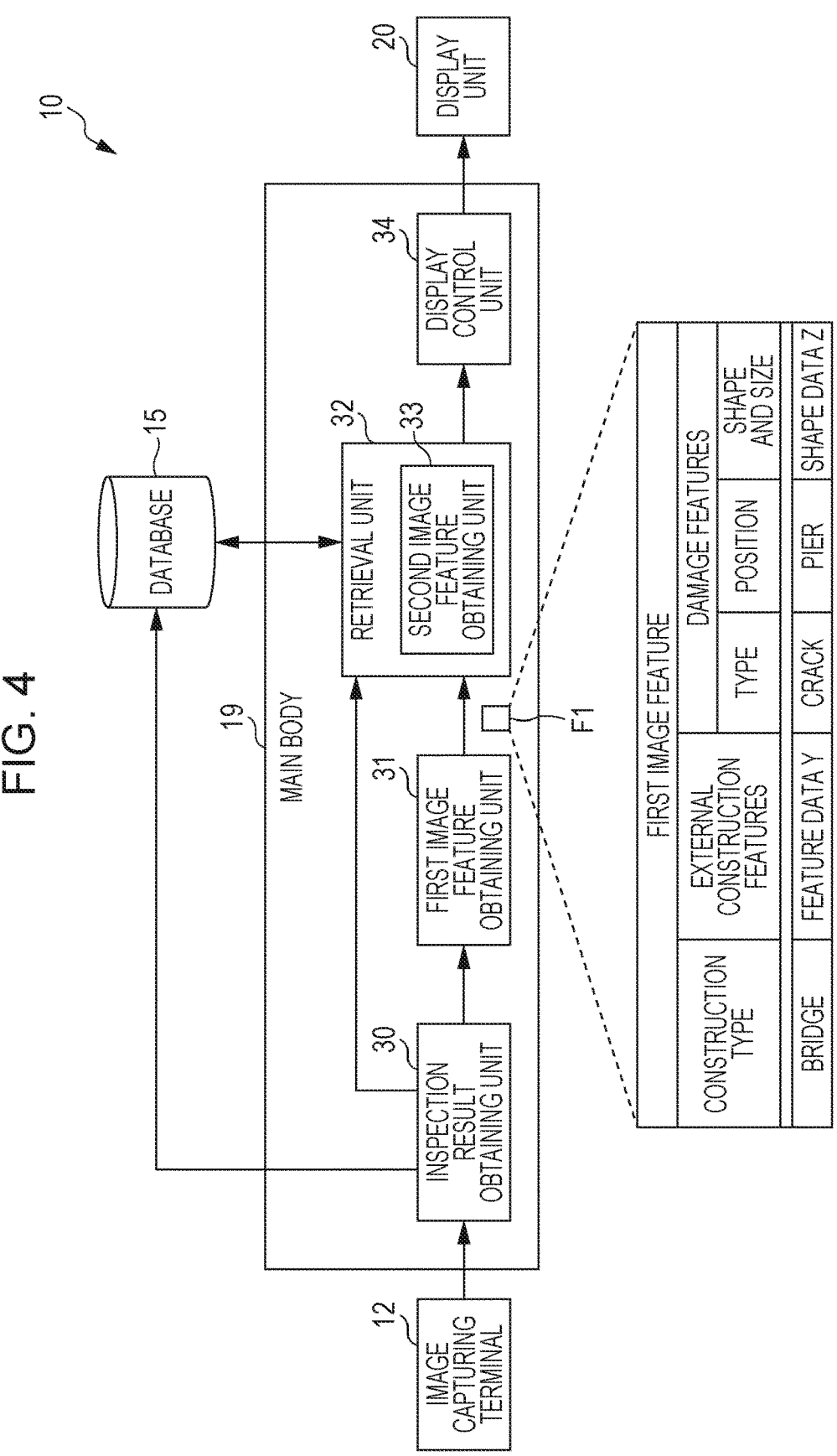

INSPECTION RESULT RETRIEVAL DEVICE AND METHOD

CROSS-REFERENCE TO RELATED APPLICATIONS

This application is a Continuation of PCT International Application No. PCT/JP2016/074894 filed on Aug. 26, 2016, which claims priority under 35 U.S.C. § 119(a) to Japanese Patent Application No. 2015-191074 filed on Sep. 29, 2015. Each of the above application(s) is hereby expressly incorporated by reference, in its entirety, into the present application.

BACKGROUND OF THE INVENTION

1. Field of the Invention

The present invention relates to an inspection result retrieval device and an inspection result retrieval method for retrieving inspection results from a database that stores inspection results regarding constructions.

2. Description of the Related Art

Various constructions (also called structures or infrastructures), such as bridges, roads, tunnels, dams, and buildings, are inspected by inspectors having expertise. The result of inspection of a construction conducted by an inspector includes various types of information, such as the date and time of inspection, information (for example, an ID (identification), a name, and/or position information) with which the inspected construction can be identified, the type of construction, structural information about the construction, inspection image data of an inspection portion of the construction, the presence of damage in the inspection portion, the type of damage, and the assessment of damage. An inspector inspects a construction in accordance with, for example, a checklist created in advance and indicating inspection items and the details of inspection and reports the result of inspection of the construction (see JP2006-338312A).

The result of inspection of a construction reported by an inspector is accumulated in a database. Therefore, it is possible to access the database while using, for example, the date and time of inspection, the type of construction, the type of damage, and the category of assessed damage as search conditions and to retrieve and display inspection results that match the search conditions (see Kei Kawamura and one other, "Development and Practical Use of Bridge Maintenance and Management Assistance Database System for Yamaguchi Prefecture", pp. 3 to 4, [online], [retrieved on Aug. 31, 2015], the Internet <URL: https://www.cgr.mlit.go.j/ctc/tech_dev/kouryu/T-Space/ronbun/pdf/22_yamaguti/22_yamaguti_3-1.pdf, hereinafter referred to as NPL 1). Further, Yusho Ishikawa, "Infrastructure Management using ICT, Collection and Analysis of Information regarding Maintenance and Management of Roads, Bridges, Public Facilities, etc.", p. 13, [online], [retrieved on Aug. 31, 2015], the Internet <http://download.microsoft. com/download/F/D/7/FD769695-8B4C-4E56-9F 18-5E3991B6B3AB/a3.pdf> (hereinafter referred to as NPL 2) discloses a technique for retrieving, from a database, and displaying inspection image data of past inspection results similar to inspection image data of a newly obtained inspection result. With the techniques described in NPL 1 and NPL 2, it is possible to assess damage that has occurred in a construction by making a comparison with past inspection results accumulated in a database.

SUMMARY OF THE INVENTION

In a case of predicting the development of damage that has occurred in a construction, it is difficult to determine which past inspection results are suitable for the prediction even if past inspection results accumulated in a database are retrieved as described in NPL 1 and NPL 2. Specifically, the degree of future development of damage that has occurred in a construction differs depending on various conditions, and therefore, it is difficult to retrieve inspection results suitable for the prediction from among a large number of past inspection results stored in a database. As a result, highly accurate prediction of future development of damage that has occurred in a construction has its limits.

The present invention has been made in view of the above-described issues, and its object is to provide an inspection result retrieval device and an inspection result retrieval method with which inspection results suitable for predicting the development of damage that has occurred in a construction can be retrieved from a database and displayed on a display unit.

An inspection result retrieval device for achieving the object of the present invention includes: an inspection result obtaining unit that obtains a first inspection result regarding a construction, the first inspection result including a usage condition and a locational and environmental condition of the construction and an inspection image of an inspection portion of the construction; a first image feature obtaining unit that obtains an image feature of the inspection image from the first inspection result obtained by the inspection result obtaining unit, the image feature including at least a damage feature, which is a feature of damage that has occurred in the inspection portion; a retrieval unit that retrieves, from a database storing a plurality of second inspection results regarding a plurality of constructions, the plurality of second inspection results each including the usage condition, the locational and environmental condition, and the inspection image, one or more second inspection results among the plurality of second inspection results, the one or more second inspection results corresponding to one of the image feature obtained by the first image feature obtaining unit or a construction condition that includes at least one of the usage condition or the locational and environmental condition; and a display control unit that causes a display unit to display the one or more second inspection results retrieved by the retrieval unit. The retrieval unit tries to retrieve one or more specific inspection results that correspond to the other of the image feature or the construction condition from among the retrieved one or more second inspection results. In a case where a retrieval result obtained by the retrieval unit trying to retrieve the one or more specific inspection results includes the one or more specific inspection results, the display control unit causes the display unit to display the one or more specific inspection results preferentially over other inspection results among the one or more second inspection results retrieved by the retrieval unit. Note that the term "retrieval" used here includes the concept of, for example, extraction, filtering, obtainment, and selection, and the term "corresponding" used in a phrase "the one or more second inspection results or the one or more specific inspection results corresponding to" includes the concept of, for example, "matching", "similar", and "closer".

With the inspection result retrieval device described above, from among the one or more second inspection results that are retrieved by the retrieval unit and that correspond to one of the image feature or the construction condition, one or more specific inspection results that correspond to the other of the image feature or the construction condition can be selected.

In the inspection result retrieval device according to another aspect of the present invention, the retrieval unit has a second image feature obtaining unit that obtains the image feature of the inspection image included in each of the plurality of second inspection results and, in a case of retrieval of the one or more second inspection results or the one or more specific inspection results corresponding to the image feature obtained by the first image feature obtaining unit, performs the retrieval using the image feature obtained by the second image feature obtaining unit. Accordingly, the retrieval unit can retrieve the one or more second inspection results that correspond to the image feature obtained by the first image feature obtaining unit from the database.

In the inspection result retrieval device according to another aspect of the present invention, the first inspection result and the plurality of second inspection results each include identification information with which the construction that is an inspection target is identifiable; the display control unit has a comparison display mode in which, in a case where it is determined, on the basis of the identification information included in the first inspection result and the identification information included in each of the one or more second inspection results retrieved by the retrieval unit, that a retrieval result obtained by the retrieval unit includes a second inspection result that is a result of inspection of the same construction for which the first inspection result is obtained, the display control unit causes the display unit to display both the inspection image included in the first inspection result and the inspection image included in the second inspection result; and the inspection result retrieval device further includes an image processing unit that performs, for at least one of the inspection image included in the first inspection result or the inspection image included in the second inspection result, image processing for matching a shape and position of the construction in the inspection image included in the first inspection result and a shape and position of the construction in the inspection image included in the second inspection result to be displayed on the display unit in the comparison display mode on the basis of a feature other than the damage feature included in the image feature obtained by the first image feature obtaining unit and in the image feature obtained by the second image feature obtaining unit. Accordingly, changes in the damage of the construction from the previous second inspection result can be known, and changes over time in an inspection portion of the construction and changes over time in the damage that has occurred in the inspection portion can be checked. As a consequence, the development of the damage that has occurred in the construction can be predicted with higher accuracy.

In the inspection result retrieval device according to another aspect of the present invention, the display control unit performs preliminary display in which the display control unit causes the display unit to display the inspection image included in the first inspection result obtained by the inspection result obtaining unit before the first image feature obtaining unit obtains the image feature; the inspection result retrieval device further includes an acceptance unit that, in a case where a specification operation of specifying a damage portion of the damage in the inspection image preliminarily displayed on the display unit is performed, accepts input of the specification operation; and the first image feature obtaining unit obtains the image feature that includes the damage feature of the damage portion of the damage specified in the specification operation accepted by the acceptance unit from the inspection image. Accordingly, one or more specific inspection results suitable for predicting the development of a type of damage specified in the specification operation among a plurality of types of damage having occurred in the construction can be retrieved from the database and displayed on the display unit. As a consequence, the development of the specified type of damage can be predicted with high accuracy.

In the inspection result retrieval device according to another aspect of the present invention, the damage feature includes at least one of a position of the damage in the inspection portion, a type of the damage, or a shape and size of the damage.

In the inspection result retrieval device according to another aspect of the present invention, in a case where a selection operation of selecting a second inspection result from among the one or more second inspection results displayed by the display unit is accepted, the retrieval unit retrieves, from the database, one or more second inspection results that correspond to a specific construction that is an inspection target in the second inspection result selected in the selection operation; and the display control unit causes the display unit to display, as an inspection history of the specific construction, the one or more second inspection results regarding the specific construction retrieved by the retrieval unit in accordance with the selection operation. Accordingly, the inspection history (past second inspection results) of the specific construction that corresponds to the second inspection result selected in the selection operation can be checked.

In the inspection result retrieval device according to another aspect of the present invention, in a case of retrieving the one or more second inspection results that correspond to the specific construction, the retrieval unit retrieves, from the database, one or more second inspection results that correspond to the construction that is an inspection target in the first inspection result; and the display control unit causes the display unit to display the one or more second inspection results regarding the specific construction retrieved by the retrieval unit and the one or more second inspection results regarding the construction that is an inspection target in the first inspection result. Accordingly, the inspection histories of both the constructions are displayed so as to enable a comparison. As a consequence, the development of the damage having occurred in the construction that is the inspection target in the first inspection result can be predicted with high accuracy.

An inspection result retrieval method for achieving the object of the present invention includes: an inspection result obtaining step of obtaining a first inspection result regarding a construction, the first inspection result including a usage condition and a locational and environmental condition of the construction and an inspection image of an inspection portion of the construction; a first image feature obtaining step of obtaining an image feature of the inspection image from the first inspection result obtained in the inspection result obtaining step, the image feature including at least a damage feature, which is a feature of damage that has occurred in the inspection portion; a retrieval step of retrieving, from a database storing a plurality of second inspection results regarding a plurality of constructions, the plurality of second inspection results each including the usage condition, the locational and environmental condition, and the inspection image, one or more second inspection results among the plurality of second inspection results, the one or more second inspection results corresponding to one of the image feature obtained in the first image feature obtaining step or a construction condition that includes at least one of the usage condition or the locational and environmental condition; and a display control step of causing a display unit to display the one or more second inspection results retrieved in the retrieval step. The retrieval step includes trying to retrieve one or more specific inspection results that correspond to the other of the image feature or the construction condition from among the retrieved one or more second inspection results. In a case where a retrieval result obtained in the retrieval step trying to retrieve the one or more specific inspection results includes the one or more specific inspection results, the display control step includes causing the display unit to display the one or more specific inspection results preferentially over other inspection results among the one or more second inspection results retrieved in the retrieval step.

With the inspection result retrieval method and the inspection result retrieval method according to the present invention, inspection results suitable for predicting the development of damage that has occurred in a construction can be retrieved from the database and displayed on the display unit.

BRIEF DESCRIPTION OF THE DRAWINGS

FIG. 3 is an explanatory diagram for explaining second inspection results stored in a database;

FIG. 4 is a block diagram illustrating a configuration of a main body of the inspection result retrieval device according to the first embodiment;

DESCRIPTION OF THE PREFERRED EMBODIMENTS

Inspection Result Retrieval Device according to First Embodiment

Figure 1:
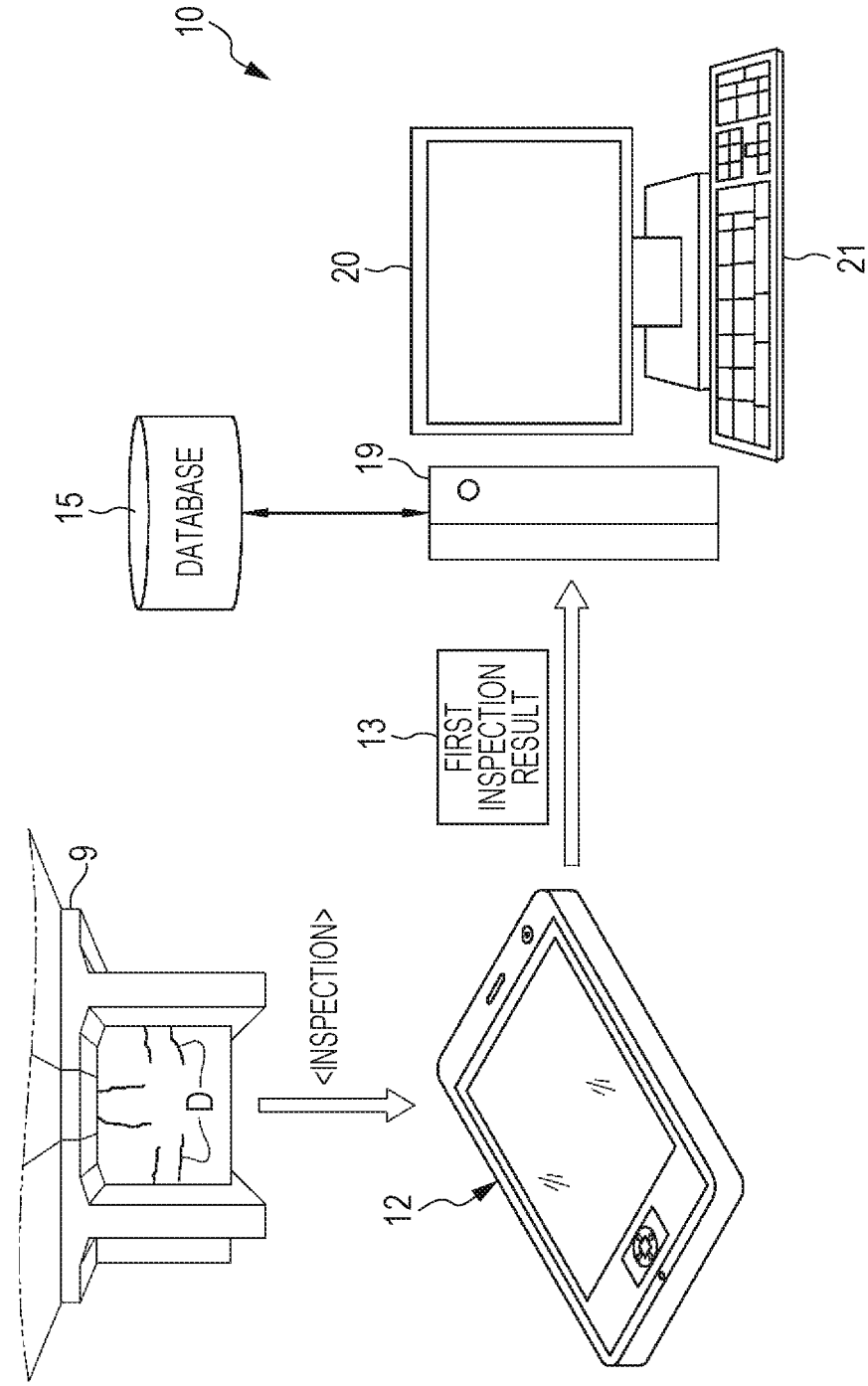
FIG. 1 is a schematic diagram of an inspection result retrieval device according to a first embodiment.

FIG. 1 is a schematic diagram of an inspection result retrieval device 10 according to a first embodiment. As illustrated in FIG. 1, the inspection result retrieval device 10 obtains, from an image capturing terminal 12 owned by an inspector who inspects a construction 9, which is a bridge, a road, a tunnel, a dam, a building, or any other type of construction, a first inspection result 13, which is the result of inspection of the construction 9. Then, the inspection result retrieval device 10 retrieves, from a database 15, and displays second inspection results 17 (see FIG. 3), which are past inspection results suitable for predicting the development of damage D of the construction 9, on the basis of the obtained first inspection result 13.

The inspection result retrieval device 10 includes a main body 19, which obtains the first inspection result 13 and retrieves the second inspection results 17, a display unit 20, which displays the second inspection results 17 obtained as a result of retrieval by the main body 19, and an operation unit 21. As the main body 19, for example, a personal computer or a server is preferably used. To the main body 19, the database 15 is connected via a communication line of any type. The display unit 20 is a monitor that is connected to the main body 19. The operation unit 21 is, for example, a keyboard or a mouse that is used to perform various operations for the inspection result retrieval device 10.

As the image capturing terminal 12, for example, a smartphone, a tablet terminal, a portable personal computer, or any other portable terminal having an image capturing function and an information input function is preferably used. Note that, as the image capturing terminal 12, for example, a digital camera can also be used. In a case where the information input function of the digital camera is unsatisfactory, the unsatisfactory function can be complemented by information input using, for example, a personal computer. The image capturing terminal 12 generates the first inspection result 13 regarding the construction 9 in response to an operation by an inspector and outputs the first inspection result 13 to the main body 19 of the inspection result retrieval device 10.

Figure 2:
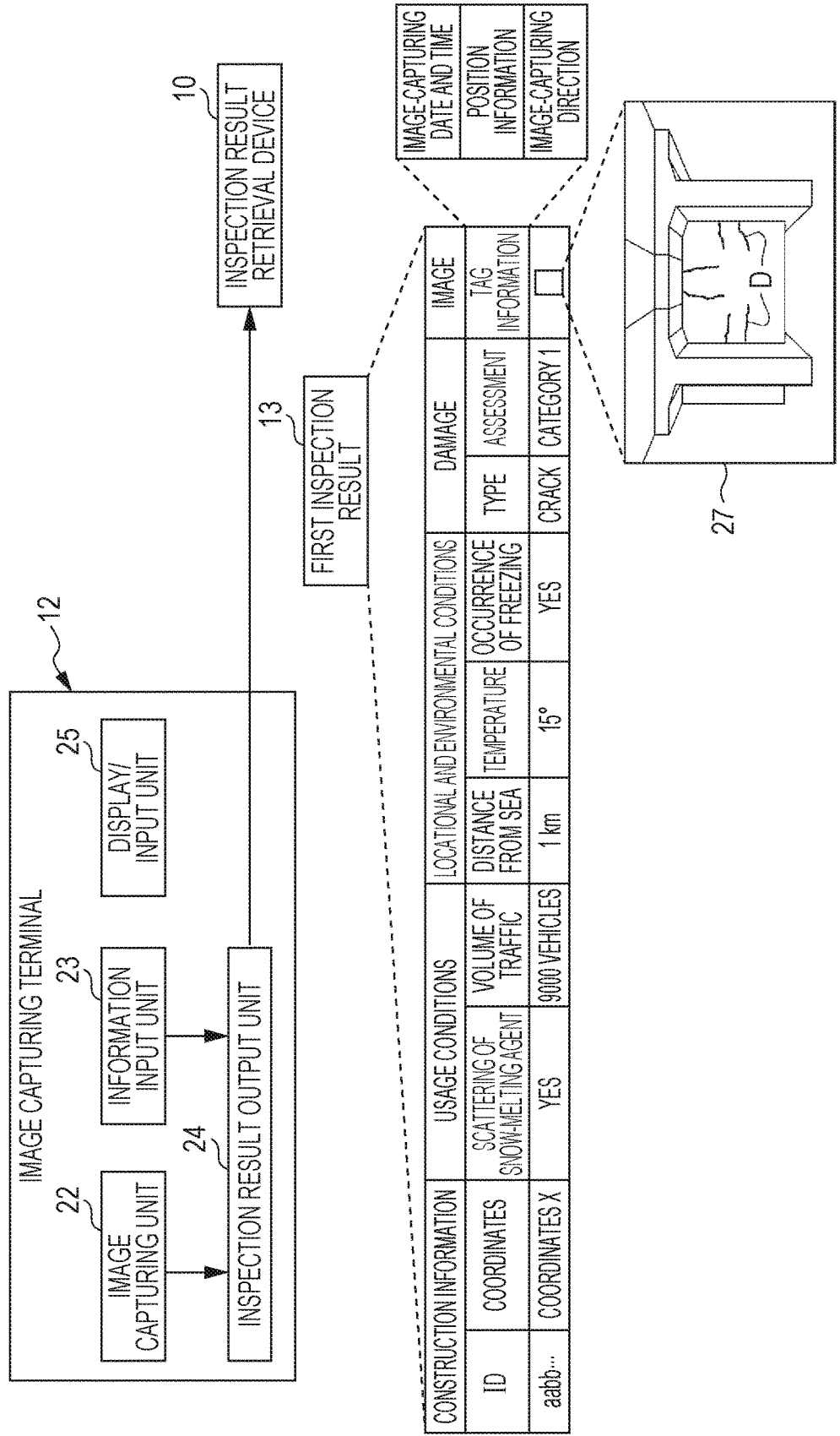
FIG. 2 is a block diagram illustrating a configuration of an image capturing terminal.

FIG. 2 is a block diagram illustrating a configuration of the image capturing terminal 12. As illustrated in FIG. 2, the image capturing terminal 12 includes an image capturing unit 22, an information input unit 23, an inspection result output unit 24, and a display/input unit 25, which is a touch-panel-type unit. The image capturing unit 22 has an optical system and an image sensor. The image capturing unit 22 captures an image of an inspection portion of the construction 9 in response to an image capturing operation performed by an inspector, generates inspection image data 27, which is an inspection image according to the present invention, and outputs the inspection image data 27 to the inspection result output unit 24.

To the inspection image data 27, tag information is added. The tag information includes the image-capturing date and time when the inspection image data 27 is captured, position information indicating the image-capturing position where the inspection image data 27 is captured, and the image-capturing direction of the image capturing terminal 12 when the inspection image data 27 is captured. The image-capturing date and time can be obtained from a clock unit built in the image capturing terminal 12 and is information indicating the date and time when the construction 9 is inspected. The position information can be obtained from, for example, a GPS (Global Positioning System) sensor built in the image capturing terminal 12. The image-capturing direction can be obtained from, for example, a geomagnetic sensor built in the image capturing terminal 12.

The information input unit 23 accepts, for example, "construction information", "usage conditions" and "locational and environmental conditions" of the construction 9, and the "type" and "assessment" of the damage D that has occurred in an inspection portion of the construction 9 input by using an operation key not illustrated or the display/input unit 25 and outputs the result of input to the inspection result output unit 24.

The "construction information" is information including an ID that is an identification number assigned in advance to the construction 9 and coordinates that indicate the position of the construction 9 (the position information included in the tag information can be used instead), with which the construction 9 can be identified. Note that the "construction information" may include the name and address of the construction 9, the type of the construction 9 (such as a bridge, a road, a tunnel, a dam, or a building), and the structure of the construction 9 (such as a steel structure, a concrete structure, or a wooden structure) in addition to the "ID" and the "coordinates".

The "usage conditions" are conditions indicating how the construction 9 is used, and specifically, conditions that may affect the occurrence or development of the damage D of the construction 9. For example, in a case where the construction 9 is a road or a bridge, examples of the "usage conditions" include whether a snow-melting agent is scattered and the volume of traffic, that is, the number of vehicles per unit time (the vehicles may be limited to specific vehicles, such as overloaded vehicles or large vehicles); however, the usage conditions are not limited to these.

The "locational and environmental conditions" are locational conditions of the location where the construction 9 is present and environmental conditions of the surroundings of the construction 9, and specifically, conditions that may affect the occurrence or development of the damage D of the construction 9. Examples of the "locational and environmental conditions" include the distance from the sea, the temperature (average temperature or seasonal temperature), and the occurrence of freezing; however, the locational and environmental conditions are not limited to these and may include other conditions, such as the annual precipitation.

The "type" of the damage D indicates a publicly known damage type that may occur in the construction 9, such as a crack, a leakage, corrosion, a breakage, or peeling. Note that, in the example described here, the damage D illustrated in, for example, FIG. 1 and FIG. 2 is a crack.

The "assessment" of the damage D indicates the assessed degree of the damage D that has occurred in the construction 9. In the example described here, the degree of the damage D is assessed and classified into four categories, namely, categories 1 to 4. The category 1 indicates a state where the functions of the construction 9 are not impaired. The category 2 indicates a state where the functions of the construction 9 are not impaired but it is desirable to take a measure from the viewpoint of preventive maintenance. The category 3 indicates a state where the functions of the construction 9 are likely to be impaired and a measure needs to be taken earlier. The category 4 indicates a state where the functions of the construction 9 are impaired or highly likely to be impaired and a measure needs to be taken urgently. For the details of these four categories, please refer to the regular inspection guidelines for roads and bridges and the regular inspection guidelines for bridges published by the Road Bureau of the Ministry of Land, Infrastructure, Transport and Tourism. Note that the method for "assessment" of the damage D is not limited to the method based on the above-described categories.

The inspection result output unit 24 generates the first inspection result 13, which includes the inspection image data 27 and its tag information input from the image capturing unit 22, the construction information, the usage conditions, and the locational and environmental conditions of the construction 9 and the type and assessment of the damage D input from the information input unit 23, and outputs the first inspection result 13 to the main body 19 of the inspection result retrieval device 10. Note that the first inspection result 13 is not limited to the example illustrated in FIG. 2, and information other than the "usage conditions", the "locational and environmental conditions", and the "image" may be changed as appropriate.

The display/input unit 25 is a touch panel that displays, for example, an image or text information to visually communicate information to a user and that detects a user operation performed for the displayed information. The display/input unit 25 displays a live view image while the image capturing unit 22 is capturing an image and displays an input screen for various types of information and conditions that are input to the information input unit 23.

FIG. 3 is an explanatory diagram for explaining the second inspection results 17 stored in the database 15. Here, the second inspection results 17 are past inspection results regarding constructions 9 obtained as a result of inspections conducted by inspectors before the inspection result retrieval device 10 starts retrieval. The first inspection result 13 output to the inspection result retrieval device 10 from the image capturing terminal 12 is stored in the database 15 as a new second inspection result 17.

As illustrated in FIG. 3, the second inspection results 17 in the example described here each include the "inspection date and time" when the inspection of the construction 9 is conducted, and further include "construction information", "usage conditions", "locational and environmental conditions", the "type" and "assessment" of the damage D, and the inspection image data 27 (tag information is not illustrated), which are similar to those of the first inspection result 13. Note that the "inspection date and time" can be obtained from the "image-capturing date and time" (see FIG. 2) in the tag information of the inspection image data 27. The second inspection results 17 are not limited to the example illustrated in FIG. 3 and may include various types of information (for example, the name and ID of the inspector).

FIG. 4 is a block diagram illustrating a configuration of the main body 19 of the inspection result retrieval device 10 according to the first embodiment. As illustrated in FIG. 4, the main body 19 is constituted by, for example, various arithmetic units and processing units including a CPU (central processing unit) and a storage unit and includes an inspection result obtaining unit 30, a first image feature obtaining unit 31, a retrieval unit 32, a second image feature obtaining unit 33, and a display control unit 34.

The inspection result obtaining unit 30 is, for example, a communication interface that can be connected to the image capturing terminal 12 for wired or wireless communication. The inspection result obtaining unit 30 outputs the first inspection result 13 obtained from the image capturing terminal 12 to the first image feature obtaining unit 31 and outputs the "usage conditions" and "locational and environmental conditions" included in the first inspection result 13 to the retrieval unit 32. The inspection result obtaining unit 30 outputs, after completion of retrieval by the retrieval unit 32 described below, the first inspection result 13 obtained from the image capturing terminal 12 to the database 15 as the second inspection result 17 regarding the construction 9.

The first image feature obtaining unit 31 obtains a first image feature F1 of the inspection image data 27 from the first inspection result 13 input from the inspection result obtaining unit 30. The first image feature F1 at least includes features of the damage D that has occurred in an inspection portion of the construction 9 and, in the example described here, includes a "construction type", "external construction features", and "damage features".

The "construction type" indicates the type of the construction 9 (for example, a bridge, a road, a tunnel, a dam, or a building) included in the inspection image data 27. Note that, in a case where information with which the "construction type" can be identified is included in the first inspection result 13 described above, the "construction type" can be identified from the first inspection result 13. On the other hand, in a case where information with which the "construction type" can be identified is not included in the first inspection result 13, the "construction type" can be identified from the inspection image data 27 by, for example, using template images of various constructions 9, such as a bridge, a road, a dam, and a building, and performing a template matching method.

The "external construction features" include various types of feature data of the construction 9 included in the inspection image data 27, such as the outline and shape of the construction 9, the shape of each portion of the construction 9, and the hue distribution and average hue of the construction 9. Note that methods for obtaining "external construction features" from image data are publicly known (see, for example, JP2004-198530A), and therefore, a detailed description thereof is omitted.

The "damage features" include the "type", "position", and "shape and size" of the damage D that has occurred in an inspection portion of the construction 9 and correspond to a feature of damage according to the present invention.

Examples of the "type" of the damage D include a crack, a leakage, corrosion, a breakage, and peeling, as described above. In the example described here, the first inspection result 13 includes the "type" of the damage D (see FIG. 2), and therefore, the "type" of the damage D can be identified from the first inspection result 13. Note that, in a case where the first inspection result 13 does not include the type of the damage D, the type of the damage D can be identified from the inspection image data 27 by using template images of various types of the damage D and performing a template matching method.

The "position" of the damage D indicates a position where the damage D has occurred in the construction 9 (an inspection portion) included in the inspection image data 27. The "position" of the damage D can be identified on the basis of, for example, the result of detecting the position of the damage D in the inspection image data 27 by performing a template matching method described above and the result of identifying each portion of the construction 9 in the inspection image data 27 by performing a template matching method using template images of respective portions (for example, a bridge pier and a tunnel ceiling) of the construction 9.

The "shape and size" of the damage D is shape data that indicates the shape and size of the damage D. For example, in a case where the damage D is a "crack" or a "breakage", the "shape and size" is shape data that includes the shape, length, and thickness of the cracked or broken portion. In a case where the damage D is a leakage, corrosion, or peeling, the "shape and size" is shape data that includes the shape and area of a portion where such damage has occurred. The "shape and size" of the damage D can be identified on the basis of, for example, the result of detecting the damage D in the inspection image data 27 by performing, for example, a template matching method described above and known focal length information about the image capturing unit 22 (see FIG. 2).

The first image feature F1 is not limited to the example illustrated in FIG. 4 and needs to include at least the "damage features". Features (including features not illustrated in FIG. 4) other than the "damage features" may be included in or excluded from the first image feature F1 as appropriate. Note that, as the number of items included in the first image feature F1 increases, the retrieval unit 32 described below retrieves the second inspection results 17 that each include the inspection image data 27 having a closer similarity to the inspection image data 27 included in the first inspection result 13. Further, the "damage features" need to include at least one of the "type", the "position", or the "shape and size". In order for the retrieval unit 32 to retrieve the second inspection results 17 that each include the inspection image data 27 having a closer similarity to the inspection image data 27 included in the first inspection result 13, it is preferable that the "damage features" include all of the "type", the "position", and the "shape and size".

The first image feature obtaining unit 31 outputs the first image feature F1 obtained from the first inspection result 13 to the retrieval unit 32.

The retrieval unit 32 first accesses the database 15 (see FIG. 3) while using the first image feature F1 input from the first image feature obtaining unit 31 as a search condition and performs a first retrieval process for retrieving the second inspection results 17 that each include the inspection image data 27 having an image feature corresponding to the search condition. Here, the retrieval unit 32 has the second image feature obtaining unit 33, which obtains a second image feature F2 (see FIG. 5), which corresponds to the image feature of the inspection image data 27 included in each of the second inspection results 17, from the second inspection results 17 in the database 15, and performs the first retrieval process on the basis of the second image features F2 obtained by the second image feature obtaining unit 33.

Note that the term "retrieval" used herein includes the concept of, for example, extraction, filtering, obtainment, and selection and is not intended to specifically limit the method for retrieving inspection results that correspond to a search condition from the database 15. The term "corresponding" used herein includes the concept of, for example, "matching", "similar", and "closer".

Subsequently, the retrieval unit 32 performs a second retrieval process for selecting, from among the second inspection results 17 retrieved in the first retrieval process, the second inspection results 17 corresponding to "construction conditions" that include at least either the "usage conditions" or the "locational and environmental conditions" in the first inspection result 13.

Figure 5:
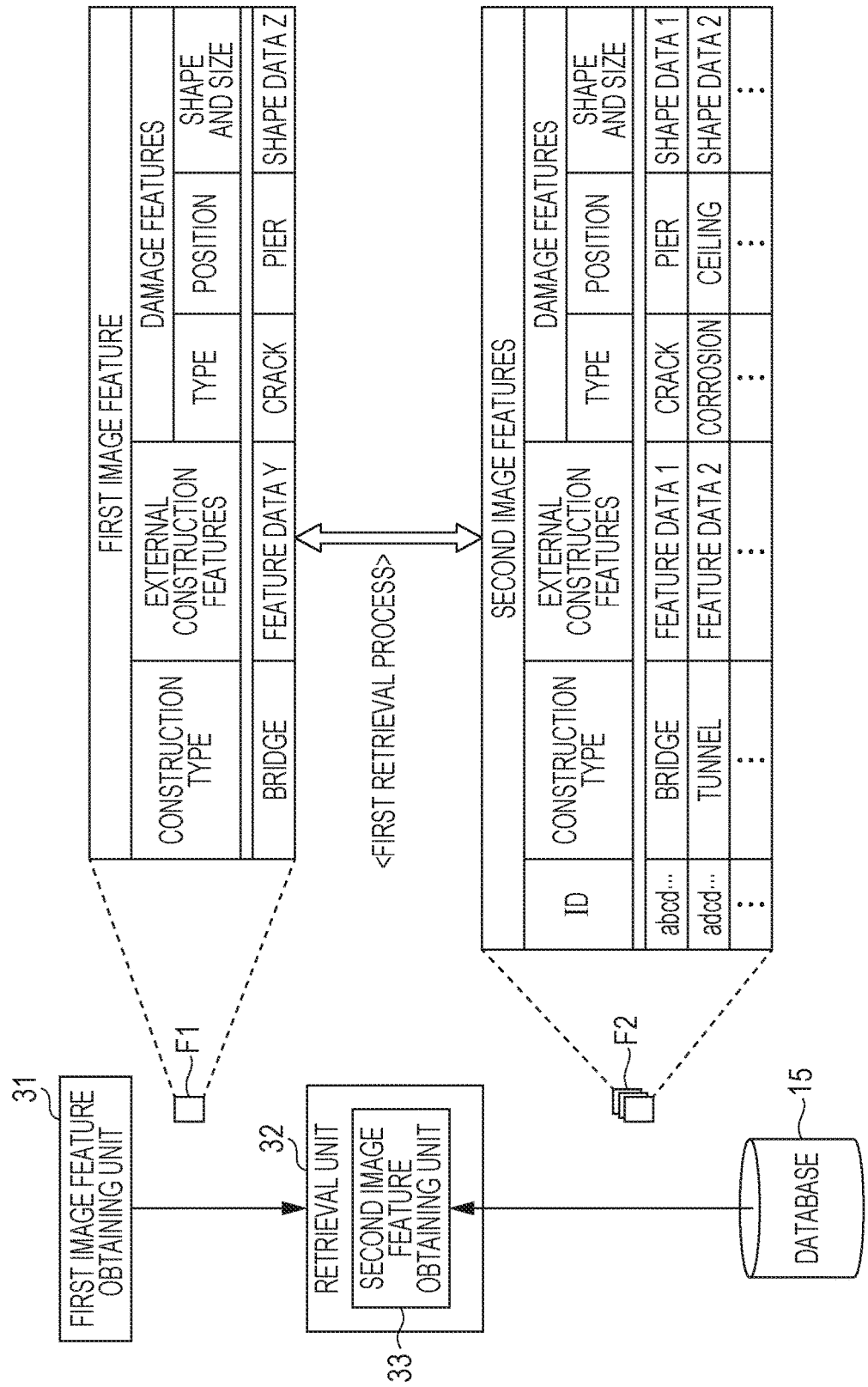
FIG. 5 is an explanatory diagram for explaining a process for obtaining second image features performed by a second image feature obtaining unit and a first retrieval process performed by a retrieval unit.

FIG. 5 is an explanatory diagram for explaining a process for obtaining the second image features F2 performed by the second image feature obtaining unit 33 and the first retrieval process performed by the retrieval unit 32. As illustrated in FIG. 5, the second image feature obtaining unit 33 obtains the second image feature F2 from each of the second inspection results 17 stored in the database 15. The second image feature F2 corresponds to the image feature of the inspection image data 27 in each second inspection result 17 and includes at least features of the damage D having occurred in an inspection portion of the construction 9 that is the inspection target in the second inspection result 17.

The second image feature F2 is basically the same as the first image feature F1 except for the "ID" of the construction 9 added to the second image feature F2 for identifying the second inspection result 17 from which the second image feature F2 is obtained. Therefore, the second image feature obtaining unit 33 obtains the second image feature F2 from each of the second inspection results 17 using a method similar to the method used by the first image feature obtaining unit 31 described above.

The retrieval unit 32 first compares the first image feature F1 input from the first image feature obtaining unit 31 with the second image feature F2 of each of the second inspection results 17 in the database 15 obtained by the second image feature obtaining unit 33 and identifies the second image features F2 that are similar (the term "similar" used here also means the "same") to the first image feature F1.

For example, the retrieval unit 32 converts the similarity between each of the items ("construction type", "external construction features", and "damage features" including the type, position, and shape and size) of each of the second image features F2 and a corresponding item of the first image feature F1 to a numerical value in accordance with a predetermined rule for numerical assessment and calculates the sum total of the numerical values of the items. After calculating the sum total of the items for each of the second inspection results 17, the retrieval unit 32 identifies the second image features F2 similar to the first image feature F1 by selecting the second image features F2 having a larger sum total or selecting the second image features F2 having a sum total that is equal to or larger than a predetermined threshold. Note that the method for identifying the second image features F2 that are similar to the first image feature F1 is not limited to the method described above, and various methods can be employed.

Subsequently, the retrieval unit 32 retrieves the second inspection results 17 that each include the inspection image data 27 having the second image feature F2 that corresponds to a search condition (first image feature F1) from the database 15 on the basis of the result of identification of the second image features F2 similar to the first image feature F1. Consequently, the first retrieval process by the retrieval unit 32 is completed.

Figure 6:
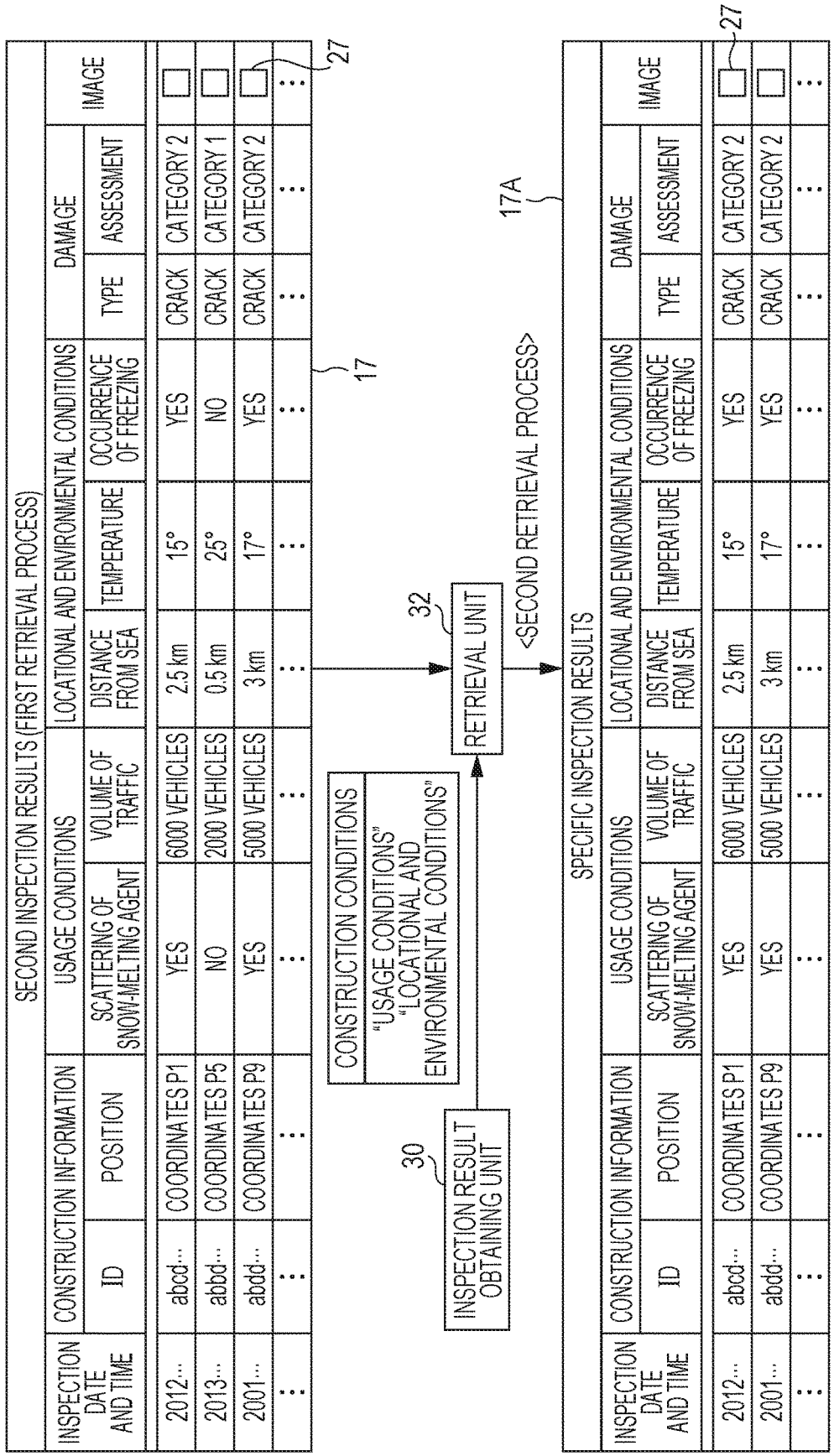
FIG. 6 is an explanatory diagram for explaining a second retrieval process performed by the retrieval unit.

FIG. 6 is an explanatory diagram for explaining the second retrieval process performed by the retrieval unit 32. As illustrated in FIG. 6, the retrieval unit 32 tries to retrieve, from among the second inspection results 17 retrieved in the first retrieval process, specific inspection results 17A corresponding to the "construction conditions" that include at least either the "usage conditions" or the "locational and environmental conditions" previously obtained from the inspection result obtaining unit 30. Note that, in the example described here, the retrieval unit 32 tries to retrieve the specific inspection results 17A that correspond to the "construction conditions", that is, at least either the "usage conditions" or the "locational and environmental conditions". The operation unit 21 (see FIG. 1) described above can be used to set whether the specific inspection results 17A that correspond to the "usage conditions", the "locational and environmental conditions", or both the "usage conditions" and the "locational and environmental conditions" are to be retrieved.

Specifically, the retrieval unit 32 obtains the "construction conditions" (the "usage conditions" and the "locational and environmental conditions") from each of the second inspection results 17 retrieved in the first retrieval process. Subsequently, the retrieval unit 32 converts the similarity between each item of the "usage conditions" and the "locational and environmental conditions" included in the "construction conditions" of each of the second inspection results 17 and a corresponding item of the "usage conditions" and the "locational and environmental conditions" obtained from the inspection result obtaining unit 30 to a numerical value in accordance with a predetermined rule for numerical assessment. Then, the retrieval unit 32 calculates the sum total of the numerical values of the items of the "usage conditions" and the sum total of the numerical values of the items of the "locational and environmental conditions" for each of the second inspection results 17 and retrieves the second inspection results 17 for which the sum total corresponding to the "usage conditions" or the sum total corresponding to the "locational and environmental conditions" is equal to or larger than a predetermined threshold. Accordingly, the retrieval unit 32 can retrieve the specific inspection results 17A that correspond to at least either the "usage conditions" or the "locational and environmental conditions".

In a case of retrieving the specific inspection results 17A that correspond to the "construction conditions", that is, the "usage conditions", the "locational and environmental conditions", or both the "usage conditions" and the "locational and environmental conditions", from among the second inspection results 17 retrieved in the first retrieval process, the retrieval unit 32 can perform retrieval by using basically the same method. Note that the method for retrieving the specific inspection results 17A is not limited to the retrieval method described above, and various methods can be employed. Consequently, the second retrieval process by the retrieval unit 32 is completed.

In a case where the specific inspection results 17A that correspond to the "construction conditions", that is, at least either the "usage conditions" or the "locational and environmental conditions", are retrieved in the second retrieval process, the retrieval unit 32 outputs the specific inspection results 17A and the second inspection results 17 retrieved in the first retrieval process described above to the display control unit 34. On the other hand, in a case where no specific inspection results 17A are retrieved in the second retrieval process, the retrieval unit 32 outputs only the second inspection results 17 retrieved in the first retrieval process to the display control unit 34.

Referring back to FIG. 4, the display control unit 34 outputs the results of retrieval by the retrieval unit 32 (the second inspection results 17 and the specific inspection results 17A) to the display unit 20 and causes the display unit 20 to display a retrieval result display screen 38 (see FIG. 7), which indicates the results of retrieval.

Figure 7:
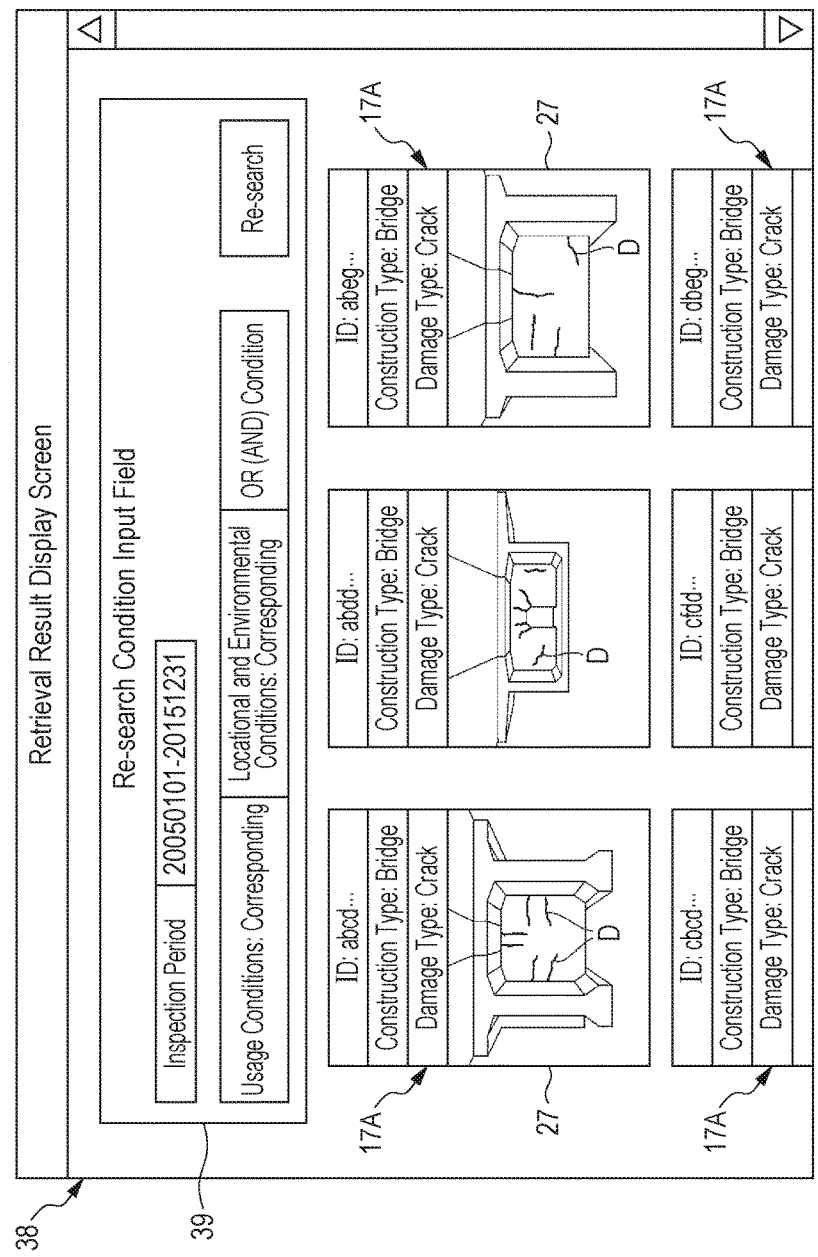
FIG. 7 is a front view of an example of a retrieval result display screen displayed on a display unit.

FIG. 7 is a front view of an example of the retrieval result display screen 38 displayed on the display unit 20. In a case where the second inspection results 17 retrieved in the first retrieval process and the specific inspection results 17A retrieved in the second retrieval process are input from the retrieval unit 32, the display control unit 34 performs priority display in which the specific inspection results 17A are displayed preferentially over the second inspection results 17 (not illustrated in FIG. 7) on the retrieval result display screen 38 of the display unit 20, as illustrated in FIG. 7.

Note that, in FIG. 7, only part of information included in each of the specific inspection results 17A illustrated in FIG. 6 described above is illustrated so as to simplify the drawing (the same applies to the second inspection results 17 not illustrated). Further, on the retrieval result display screen 38, whether information other than the inspection image data 27 in each of the specific inspection results 17A (and in each of the second inspection results 17) is to be displayed is not specifically limited.

The "priority display" in which the specific inspection results 17A are displayed preferentially over the second inspection results 17 is, in the example described here, display in which the specific inspection results 17A precede the second inspection results 17 in the order of display on the display unit 20 (the retrieval result display screen 38), that is, the specific inspection results 17A are displayed on the display unit 20 before the second inspection results 17 are displayed.

Figure 8:
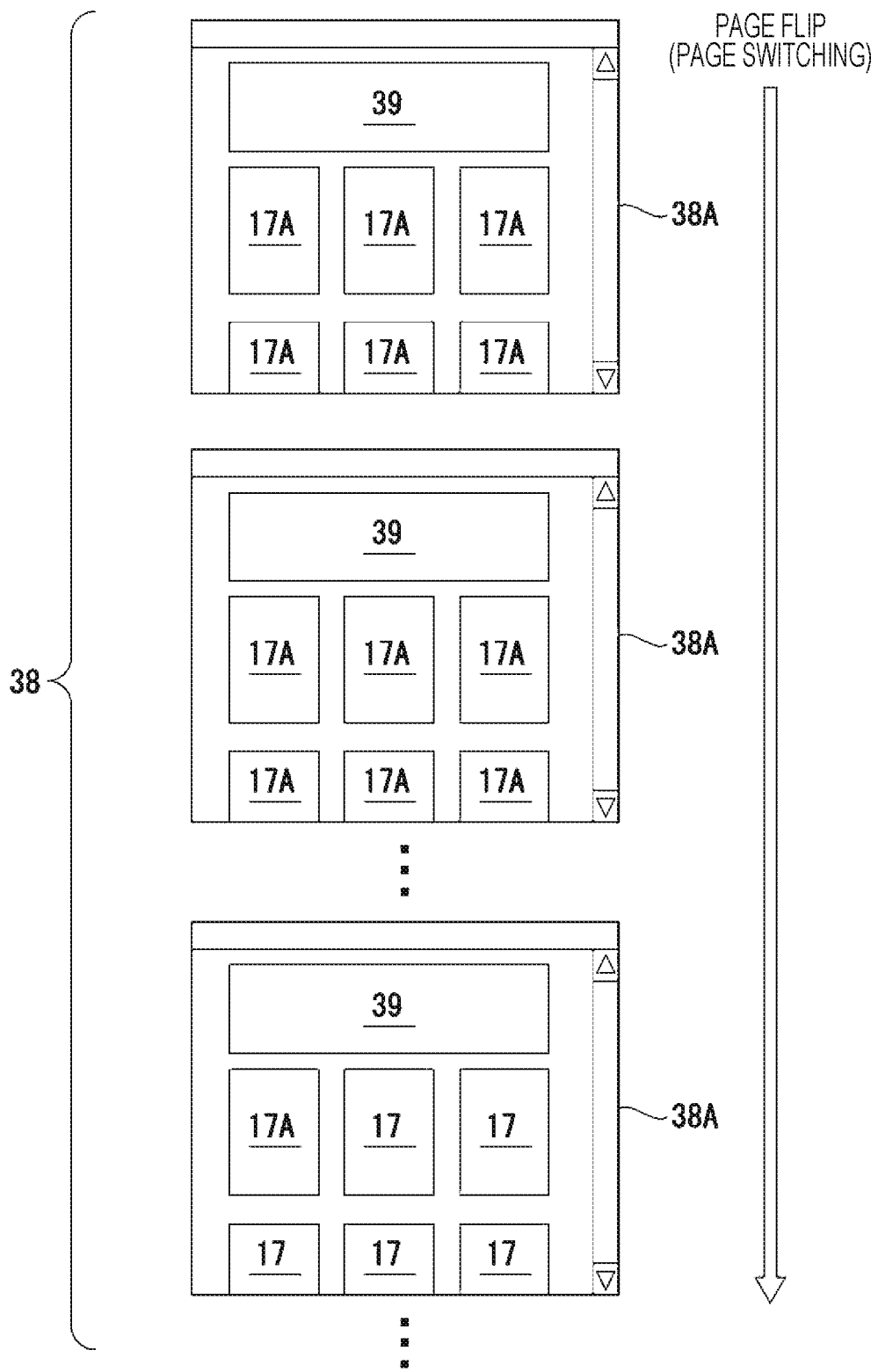
FIG. 8 is an explanatory diagram for explaining an example of priority display of specific inspection results on the retrieval result display screen.

FIG. 8 is an explanatory diagram for explaining an example of priority display of the specific inspection results 17A on the retrieval result display screen 38. As illustrated in FIG. 8, in a case where the retrieval result display screen 38 has a plurality of page areas (display areas) 38A for which a page flip by a scroll operation or page switching by a page switching operation can be performed, the specific inspection results 17A are arranged in a predetermined order based on the IDs or the inspection dates and times from the first page area, and the second inspection results 17 other than the specific inspection results 17A are subsequently arranged in a predetermined order. Accordingly, the specific inspection results 17A precede the second inspection results 17 in the order of display on the retrieval result display screen 38, and therefore, the specific inspection results 17A are displayed preferentially over the second inspection results 17 on the retrieval result display screen 38 of the display unit 20.

On the other hand, in a case where no specific inspection results 17A are input from the retrieval unit 32, the display control unit 34 performs normal display (not illustrated) in which the second inspection results 17 retrieved in the first retrieval process are displayed on the retrieval result display screen 38 of the display unit 20. In this case, only the second inspection results 17 are displayed on the retrieval result display screen 38 in a state where the second inspection results 17 are arranged in a predetermined order that is determined on the basis of, for example, the IDs or the inspection dates and times.

Further, on the retrieval result display screen 38, a re-search condition input field 39 for inputting various re-search conditions, such as an inspection period specified by inspection dates and times and search conditions (specification of "usage conditions" and "locational and environmental conditions") for the second retrieval process, is provided.

When new re-search conditions are set in the re-search condition input field 39, the retrieval unit 32 performs re-retrieval in accordance with the re-search conditions, and the result of re-retrieval is displayed on the retrieval result display screen 38 of the display unit 20.

Operations of Inspection Result Retrieval Device according to First Embodiment

Figure 9:
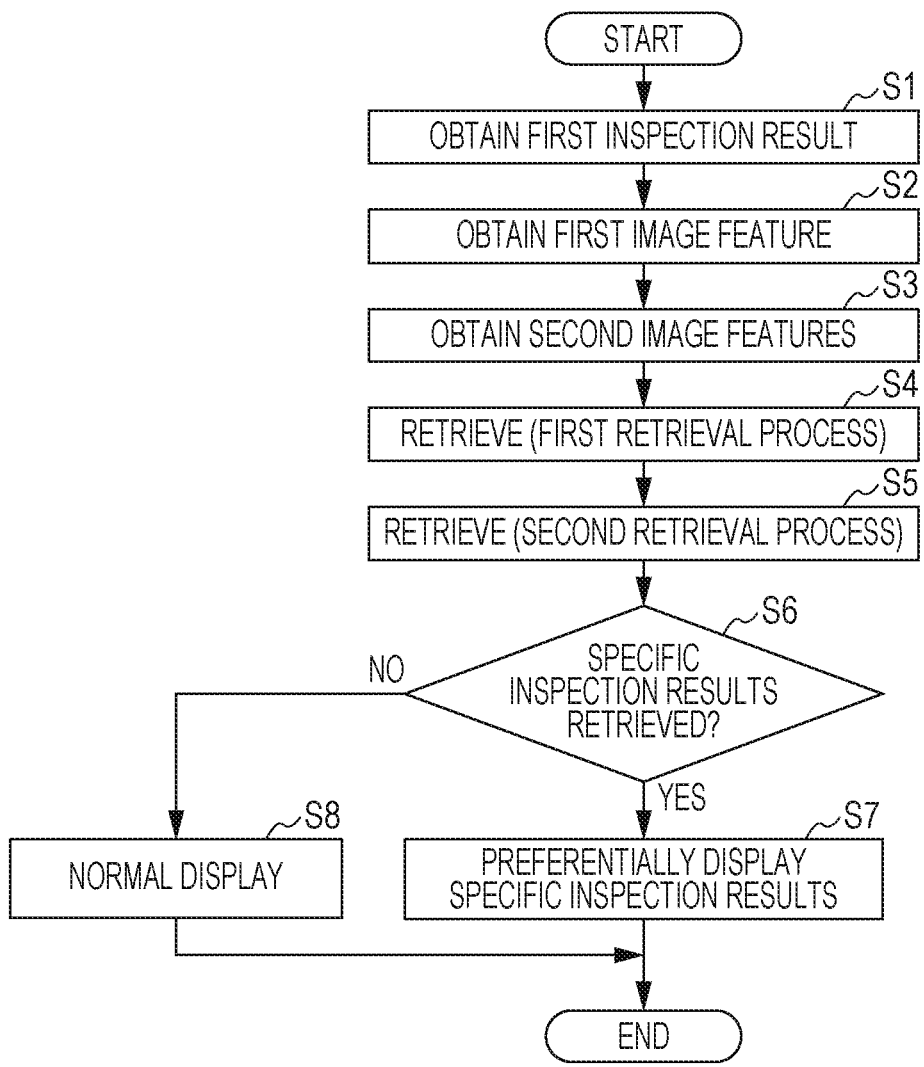
FIG. 9 is a flowchart illustrating a flow of a retrieval process performed by the inspection result retrieval device according to the first embodiment.

Now, operations of the inspection result retrieval device 10 configured as described above are described with reference to FIG. 9. FIG. 9 is a flowchart illustrating a flow of a retrieval process (an inspection result retrieval method according to the present invention) performed by the inspection result retrieval device 10 according to the first embodiment.

An inspector who has inspected an inspection portion of the construction 9 captures an image of the inspection portion using the image capturing terminal 12 and inputs, for example, "construction information", "usage conditions", "locational and environmental conditions", and the "type" and "assessment" of the damage D illustrated in FIG. 2 described above by using the operation key or the display/input unit 25 of the image capturing terminal 12. Accordingly, the inspection result output unit 24 of the image capturing terminal 12 generates and outputs, to the inspection result retrieval device 10, the first inspection result 13, and the inspection result obtaining unit 30 of the inspection result retrieval device 10 obtains the first inspection result 13 (step S1, which corresponds to an inspection result obtaining step according to the present invention).

In a case of predicting future development of the damage D having occurred in the construction 9 that is the inspection target in the first inspection result 13, the inspection result retrieval device 10 starts retrieval of the second inspection results 17 that are past inspection results suitable for the prediction. When a retrieval start operation is performed by using the operation unit 21, the first inspection result 13 is output from the inspection result obtaining unit 30 to the first image feature obtaining unit 31, and the "construction conditions" (the "usage conditions" and the "locational and environmental conditions") included in the first inspection result 13 are output to the retrieval unit 32.

When the first inspection result 13 is input, the first image feature obtaining unit 31 obtains the first image feature F1 of the inspection image data 27 from the first inspection result 13 and outputs the obtained first image feature F1 to the retrieval unit 32, as illustrated in FIG. 4 described above (step S2, which corresponds to a first image feature obtaining step according to the present invention).

When the first image feature F1 is input, the retrieval unit 32 accesses the database 15 while using the first image feature F1 as a search condition and starts the first retrieval process for retrieving the second inspection results 17 that each include the inspection image data 27 having an image feature that corresponds to the search condition.

First, the second image feature obtaining unit 33 of the retrieval unit 32 obtains the second image feature F2 from each of the second inspection results 17 stored in the database 15, as illustrated in FIG. 5 described above (step S3).

Next, the retrieval unit 32 compares the first image feature F1 with the second image feature F2 for each of the second inspection results 17 and identifies the second image features F2 that are similar to the first image feature F1 to thereby retrieve the second inspection results 17 that each include the inspection image data 27 having the second image feature F2 that corresponds to the search condition (the first image feature F1) from the database 15 (step S4, which corresponds to a retrieval step according to the present invention). Consequently, the first retrieval process is completed.

After the first retrieval process, the retrieval unit 32 performs the second retrieval process for trying to retrieve, from among the second inspection results 17 retrieved in the first retrieval process, the specific inspection results 17A that correspond to at least either the "usage conditions" or the "locational and environmental conditions" included in the "construction conditions" previously obtained from the inspection result obtaining unit 30, as illustrated in FIG. 6 described above (step S5, which corresponds to the retrieval step according to the present invention). The development of the damage D that has occurred in the construction 9 depends largely on the usage conditions or the locational and environmental conditions of the construction 9, and therefore, the specific inspection results 17A that correspond to the usage conditions or the locational and environmental conditions of the construction 9 can be selected in the second retrieval process from among the second inspection results 17 retrieved in the first retrieval process.

In a case where the specific inspection results 17A are retrieved in the second retrieval process, the retrieval unit 32 outputs the specific inspection results 17A and the second inspection results 17 retrieved in the first retrieval process described above to the display control unit 34 (Yes in step S6). Accordingly, the display control unit 34 performs priority display in which the specific inspection results 17A are displayed preferentially over the second inspection results 17 on the retrieval result display screen 38 of the display unit 20, as illustrated in FIG. 7 and FIG. 8 described above (step S7, which corresponds to a display control step according to the present invention). When the damage D having occurred in the construction 9 that is the inspection target in the first inspection result 13 is compared with the specific inspection results 17A, which are past inspection results and which correspond to the usage conditions or the locational and environmental conditions of the construction 9, for example, the state (degree), development, and severity of the damage D can be assessed.

On the other hand, in a case where no specific inspection results 17A are retrieved in the second retrieval process, the retrieval unit 32 outputs only the second inspection results 17 retrieved in the first retrieval process to the display control unit 34 (No in step S6). Accordingly, the display control unit 34 performs normal display in which only the second inspection results 17 are displayed on the retrieval result display screen 38 of the display unit 20 (step S8, which corresponds to the display control step according to the present invention).

After completion of retrieval by the retrieval unit 32, the inspection result obtaining unit 30 outputs the first inspection result 13 obtained from the image capturing terminal 12 to the database 15 as the second inspection result 17 of the construction 9. Accordingly, the new second inspection result 17 is stored in the database 15.

Effects of First Embodiment

As described above, the inspection result retrieval device 10 according to the first embodiment retrieves the second inspection results 17 from the database 15 while using the first image feature F1 of the inspection image data 27 obtained from the first inspection result 13 regarding the construction 9 as a search condition and further retrieves inspection results that correspond to the "usage conditions" or the "locational and environmental conditions" of the construction 9 from the retrieved second inspection results 17. As a result, the inspection result retrieval device 10 can retrieve the specific inspection results 17A, which are suitable for predicting the development of the damage D in an inspection portion of the construction 9, from the database 15 and cause the display unit 20 to preferentially display the specific inspection results 17A. Accordingly, the development of the damage D that has occurred in the construction 9 can be predicted with high accuracy. As a consequence, the severity of the damage D that has occurred in the construction 9 can be determined, and furthermore, the time when the damage D of the construction 9 needs to be repaired can be appropriately determined.

Inspection Result Retrieval Device according to Second Embodiment

Now, an inspection result retrieval device 10A according to a second embodiment of the present invention is described. In a case where retrieval results retrieved by the retrieval unit 32 include the second inspection results 17 (including the specific inspection results 17A in the second embodiment) that are the results of inspection of the same construction 9 for which the first inspection result 13 is obtained, the inspection result retrieval device 10A according to the second embodiment causes the display unit 20 to display the inspection image data 27 included in the first inspection result 13 and the inspection image data 27 included in each of the second inspection results 17 so as to enable a comparison.

Figure 10:
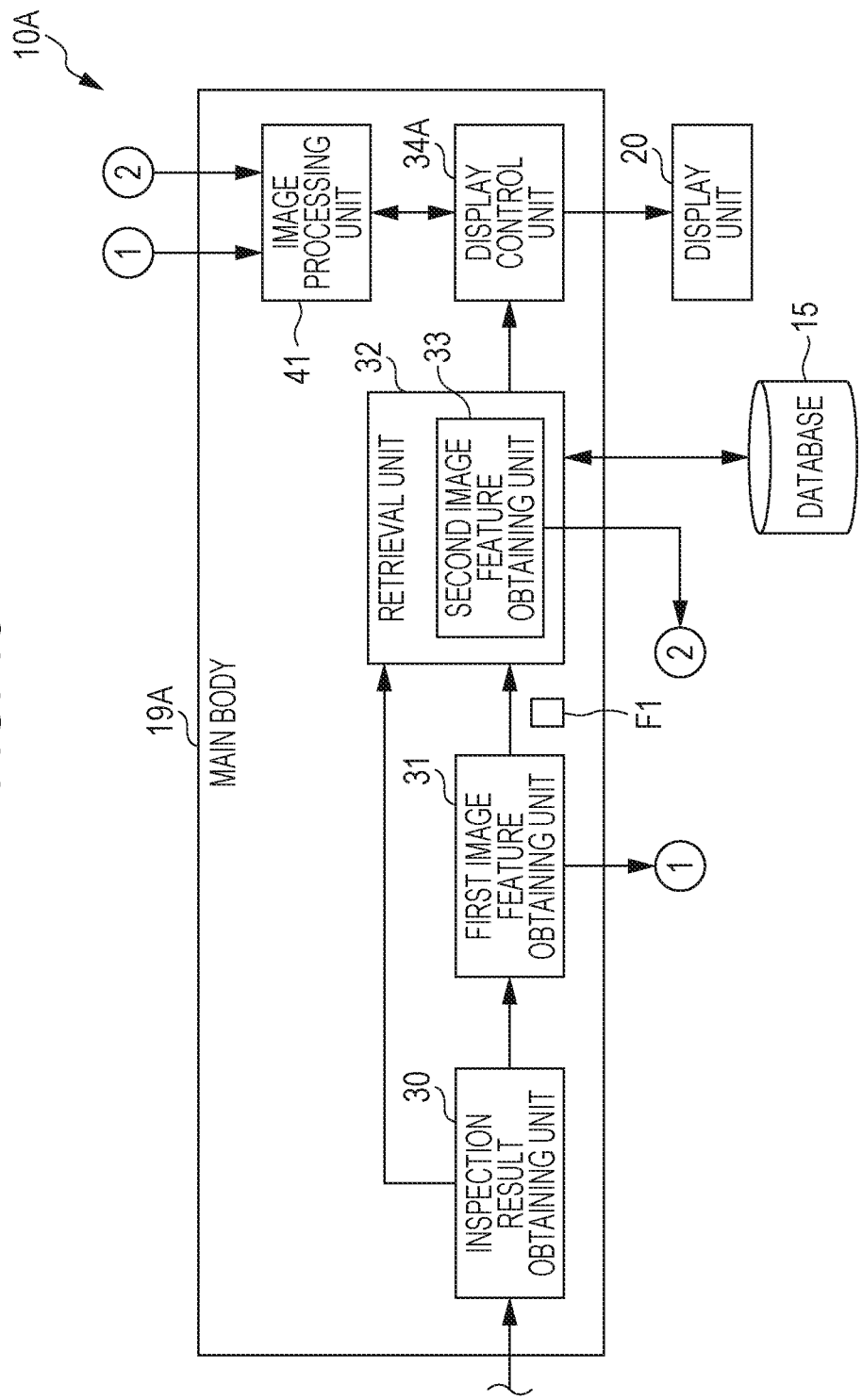
FIG. 10 is a block diagram illustrating a configuration of an inspection result retrieval device according to a second embodiment.

FIG. 10 is a block diagram illustrating a configuration of the inspection result retrieval device 10A according to the second embodiment. As illustrated in FIG. 10, the inspection result retrieval device 10A has basically the same configuration as that of the inspection result retrieval device 10 according to the first embodiment (see FIG. 4) except for a main body 19A, which includes a display control unit 34A different from the display control unit 34 according to the first embodiment and an image processing unit 41. Therefore, constituent elements having the same functions and configurations as those in the first embodiment described above are assigned the same reference numerals, and descriptions thereof are omitted.

The display control unit 34A has a retrieval result display mode and a comparison display mode. In the retrieval result display mode, the display control unit 34A causes the display unit 20 to display the retrieval result display screen 38 in a similar manner to the display control unit 34 according to the first embodiment. In the comparison display mode, the display control unit 34A causes the display unit 20 to display the inspection image data 27 included in the first inspection result 13 and the inspection image data 27 included in each of the second inspection results 17 so as to enable a comparison, the first inspection result 13 and the second inspection results 17 are results regarding the same construction 9 that is an inspection target.

In response to a display mode switching instruction from the operation unit 21, the display control unit 34A determines, on the basis of the "ID" included in the first inspection result 13 and the "ID" included in each of the second inspection results 17 that are retrieved by the retrieval unit 32, whether the retrieval results obtained by the retrieval unit 32 include the second inspection results 17 that are the results of inspection of the same construction 9 for which the first inspection result 13 is obtained. That is, the "ID" is used as identification information according to the present invention. In a case where the display control unit 34A determines that the retrieval results include the second inspection results 17 regarding the same construction 9, the display control unit 34A switches the display mode to the comparison display mode.

In a case where the display control unit 34A performs the comparison display mode, the display control unit 34A outputs, to the image processing unit 41, the inspection image data 27 included in the first inspection result 13 and the inspection image data 27 included in each of the second inspection results 17 that are the results of inspection of the same construction 9 for which the first inspection result 13 is obtained.

In a case where the inspection image data 27 included in the first inspection result 13 and the inspection image data 27 included in each of the second inspection results 17 are input from the display control unit 34A, the first inspection result 13 and the second inspection results 17 being the results of inspection of the same construction 9, the image processing unit 41 performs image processing for matching the shape and position of the construction 9 in the inspection image data 27 included in the first inspection result 13 with those of the construction 9 in the inspection image data 27 included in each of the second inspection results 17.

First, the image processing unit 41 obtains the first image feature F1 of the inspection image data 27 included in the first inspection result 13 from the first image feature obtaining unit 31 and obtains the second image feature F2 of the inspection image data 27 included in each of the second inspection results 17 from the second image feature obtaining unit 33.

Next, the image processing unit 41 performs, on the basis of features (for example, the external construction features described above) other than the damage features included in the first image feature F1 and those included in the second image feature F2 illustrated in FIG. 5 described above, image processing for matching the shape and position of the construction 9 in the inspection image data 27 included in the first inspection result 13 and those of the construction 9 in the inspection image data 27 included in each of the second inspection results 17 for at least either the inspection image data 27 included in the first inspection result 13 or the inspection image data 27 included in each of the second inspection results 17. For example, the image processing unit 41 detects feature points of the construction 9 in the inspection image data 27 included in the first inspection result 13 and feature points of the construction 9 in the inspection image data 27 included in each of the second inspection results 17 on the basis of the "external construction features" included in the first image feature F1 and those included in each of the second image features F2. The image processing unit 41 performs, for example, a scaling process or a projective transformation process for either the inspection image data 27 included in the first inspection result 13 or the inspection image data 27 included in each of the second inspection results 17 so that the positions of the feature points in the inspection image data 27 included in the first inspection result 13 match the positions of the feature points in the inspection image data 27 included in each of the second inspection results 17. Accordingly, the shape and position of the construction 9 in the inspection image data 27 included in the first inspection result 13 and those of the construction 9 in the inspection image data 27 included in each of the second inspection results 17 can match each other. Then, the image processing unit 41 outputs the inspection image data 27 included in the first inspection result 13 and the inspection image data 27 included in each of the second inspection results 17 obtained as a result of the image processing to the display control unit 34A.

Figure 11:
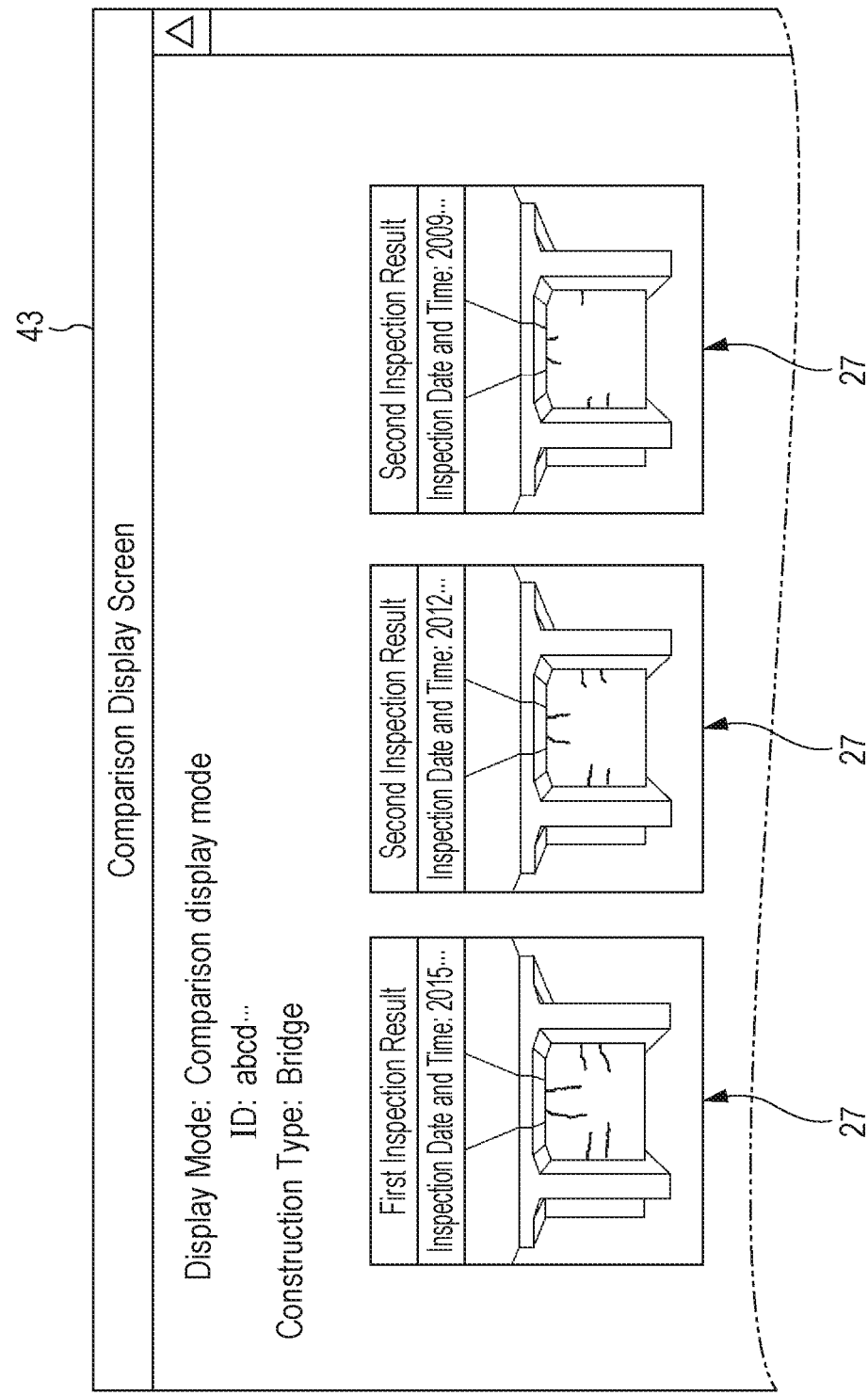
FIG. 11 is a front view illustrating an example of a comparison display screen displayed on the display unit in a comparison display mode.

FIG. 11 is a front view illustrating an example of a comparison display screen 43 displayed on the display unit 20 in the comparison display mode. As illustrated in FIG. 11, in the comparison display mode, the display control unit 34A generates the comparison display screen 43 on which the inspection image data 27 included in the first inspection result 13 and the inspection image data 27 included in each of the second inspection results 17 are arranged side by side, the pieces of inspection image data 27 being obtained as a result of image processing and input from the image processing unit 41, and causes the display unit 20 to display the comparison display screen 43. Note that, in FIG. 11, in addition to the inspection image data 27 included in the first inspection result 13 and the inspection image data 27 included in each of the second inspection results 17, for example, the "ID" and "type" of the construction 9, the "inspection date and time", and the type of inspection result are displayed on the comparison display screen 43; however, information to be displayed other than the inspection image data 27 is not specifically limited.

Note that, in a case where the display control unit 34A receives a display mode switching instruction from the operation unit 21 while the display unit 20 displays the comparison display screen 43, the display control unit 34A switches the display mode to the retrieval result display mode and causes the display unit 20 to display the retrieval result display screen 38 illustrated in, for example, FIG. 7 described above.

Operations of Inspection Result Retrieval Device according to Second Embodiment

Figure 12:
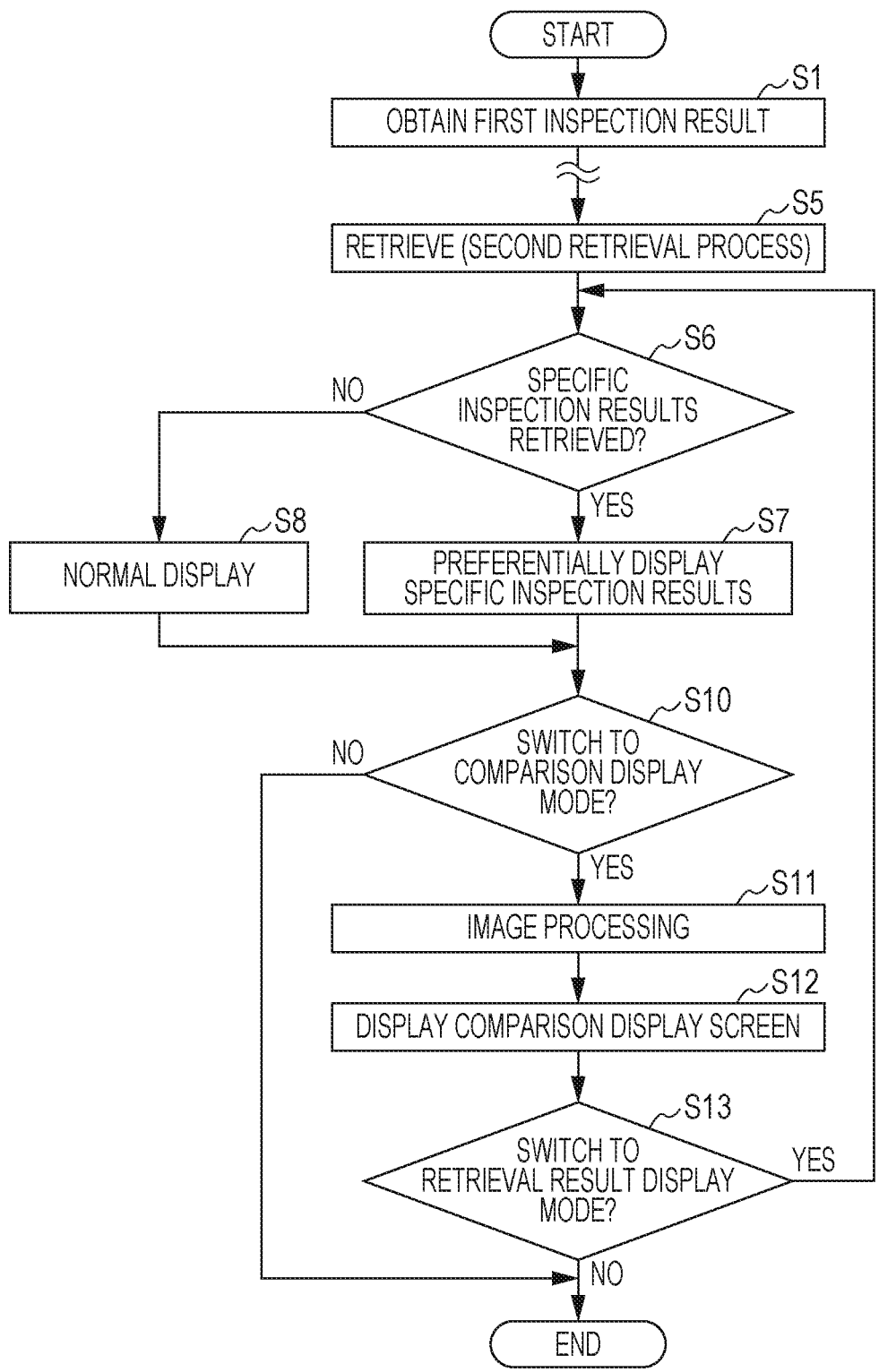
FIG. 12 is a flowchart illustrating a flow of a retrieval process performed by the inspection result retrieval device according to the second embodiment.

Now, operations of the inspection result retrieval device 10A according to the second embodiment are described with reference to FIG. 12. FIG. 12 is a flowchart illustrating a flow of a retrieval process performed by the inspection result retrieval device 10A according to the second embodiment. Note that the flow of the process from step S1 to step S8 is the same as that in the first embodiment illustrated in FIG. 9 described above, and therefore, a specific description thereof is omitted here.

After the process in step S7 or step S8, a display mode switching instruction is input to the display control unit 34A via the operation unit 21. In response to the instruction, in a case where the display control unit 34A determines, on the basis of the "ID" included in the first inspection result 13 and the "ID" included in each of the second inspection results 17, that the retrieval results obtained by the retrieval unit 32 include the second inspection results 17 that are the results of inspection of the same construction 9 for which the first inspection result 13 is obtained, the display control unit 34A switches the display mode to the comparison display mode (Yes in step S10). Further, the display control unit 34A outputs the inspection image data 27 included in the first inspection result 13 and each of the second inspection results 17 that are the results of inspection of the same construction 9 to the image processing unit 41.

Subsequently, the image processing unit 41 obtains the first image feature F1 corresponding to the inspection image data 27 included in the first inspection result 13 from the first image feature obtaining unit 31 and the second image feature F2 corresponding to the inspection image data 27 included in each of the second inspection results 17 from the second image feature obtaining unit 33. Then, the image processing unit 41 performs image processing for matching the shape and position of the construction 9 for at least either the inspection image data 27 included in the first inspection result 13 or the inspection image data 27 included in each of the second inspection results 17 on the basis of, for example, the "external construction features" (see FIG. 5) other than the damage features included in the first image feature F1 and each of the second inspection results 17. The image processing unit 41 outputs the inspection image data 27 included in the first inspection result 13 and the inspection image data 27 included in each of the second inspection results 17 obtained as a result of the image processing to the display control unit 34A (step S11).

When the inspection image data 27 included in the first inspection result 13 and the inspection image data 27 included in each of the second inspection results 17 obtained as a result of the image processing are input, the display control unit 34A generates the comparison display screen 43 as illustrated in FIG. 11 described above and causes the display unit 20 to display the comparison display screen 43 (step S12). Accordingly, the inspection image data 27 included in the first inspection result 13 and the inspection image data 27 included in each of the second inspection results 17, the first inspection result 13 and the second inspection results 17 being the results of inspection of the same construction 9, can be displayed so as to enable a comparison. Further, changes in the damage D of the construction 9 from the previous second inspection result 17 can be known.

In a case where a display mode switching instruction is input again to the display control unit 34A via the operation unit 21, the display control unit 34A switches the display mode to the retrieval result display mode and causes the display unit 20 to display the retrieval result display screen 38 as illustrated in, for example, FIG. 7 described above (Yes in step S13). Thereafter, the display control unit 34A switches the display mode between the retrieval result display mode and the comparison display mode each time a display mode switching instruction is input via the operation unit 21.

Effects of Second Embodiment

As described above, the inspection result retrieval device 10A according to the second embodiment performs image processing for matching the shape and position of the construction 9 in the inspection image data 27 included in the first inspection result 13 and those of the construction 9 in the inspection image data 27 included in each of the second inspection results 17, the first inspection result 13 and the second inspection results 17 being the results of inspection of the same construction 9, and thereafter, causes the display unit 20 to perform display so as to enable a comparison. Accordingly, changes over time in an inspection portion of the construction 9 and changes over time in the damage D that has occurred in the inspection portion can be checked. As a consequence, the development of the damage D that has occurred in the construction 9 can be predicted with higher accuracy.

Inspection Result Retrieval Device according to Third Embodiment

Now, an inspection result retrieval device 10B according to a third embodiment of the present invention is described. The inspection result retrieval device 10B according to the third embodiment enables specification of a damage portion of the damage D in the inspection image data 27 included in the first inspection result 13, the damage portion being used as a search condition in the first retrieval process. The inspection result retrieval device 10B obtains the first image feature F1 that includes the features of the specified damage portion of the damage D from the first inspection result 13 and performs the first retrieval process described above.

Figure 13:
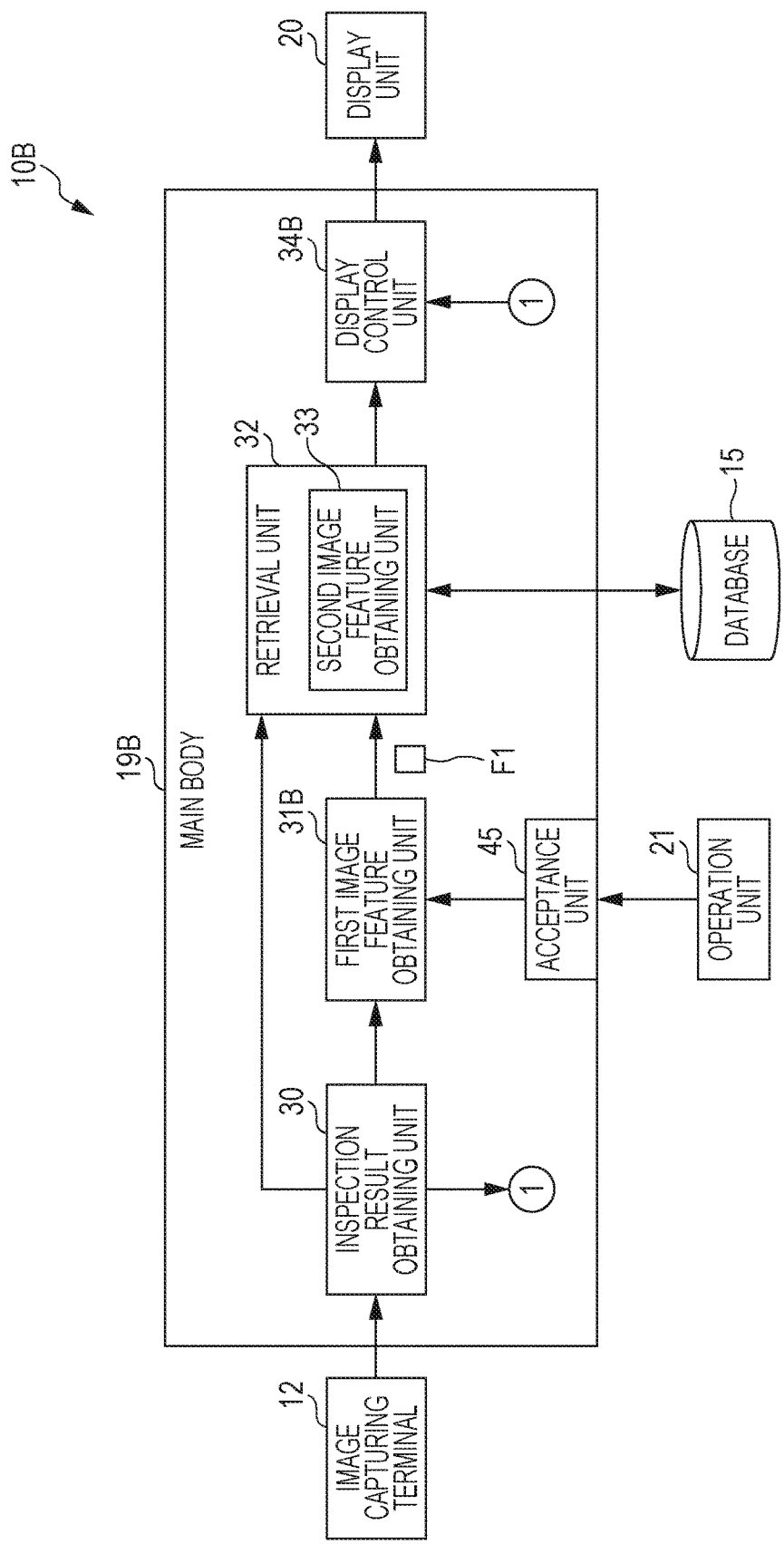
FIG. 13 is a block diagram illustrating a configuration of an inspection result retrieval device according to a third embodiment.

FIG. 13 is a block diagram illustrating a configuration of the inspection result retrieval device 10B according to the third embodiment. As illustrated in FIG. 13, the inspection result retrieval device 10B has basically the same configuration as that of the inspection result retrieval device 10 according to the first embodiment except for a main body 19B, which includes a first image feature obtaining unit 31B and a display control unit 34B different from the first image feature obtaining unit 31 and the display control unit 34 according to the first embodiment and an acceptance unit 45.

Before the first image feature obtaining unit 31B described below obtains the first image feature F1, the display control unit 34B performs preliminary display in which the display control unit 34B generates a damage portion specification screen 46 (see FIG. 14) on the basis of the inspection image data 27 included in the first inspection result 13 obtained by the inspection result obtaining unit 30 and causes the display unit 20 to display the damage portion specification screen 46.

Figure 14:
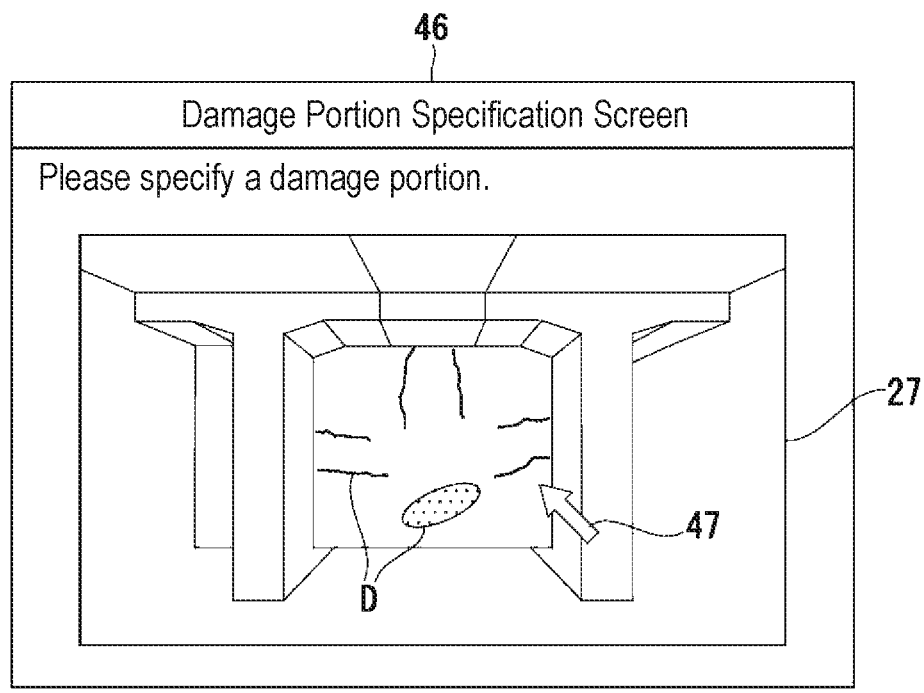
FIG. 14 is a front view of an example of a damage portion specification screen preliminarily displayed on the display unit.

FIG. 14 is a front view of an example of the damage portion specification screen 46 preliminarily displayed on the display unit 20. As illustrated in FIG. 14, on the damage portion specification screen 46, the inspection image data 27 and a cursor 47 for specifying a damage portion of the damage D of the construction 9 in the inspection image data 27 are displayed. The cursor 47 can be operated by using the operation unit 21 (see FIG. 13) of the inspection result retrieval device 10B. Accordingly, after the cursor 47 has been positioned on a specific damage portion of the damage D in the inspection image data 27 by operating the operation unit 21, a specification operation of specifying the damage portion of the damage D can be performed.

Referring back to FIG. 13, in a case where a specification operation of specifying a damage portion of the damage D is performed by using the operation unit 21, the acceptance unit 45 accepts input of the specification operation from the operation unit 21 (that is, input of position information about the specified damage portion of the damage D in the inspection image data 27) and outputs the input result of the specification operation to the first image feature obtaining unit 31B.

The first image feature obtaining unit 31B obtains the first image feature F1 of the inspection image data 27 from the first inspection result 13 input from the inspection result obtaining unit 30 by using basically the same method as that used by the first image feature obtaining unit 31 according to the first embodiment illustrated in FIG. 4 described above. Here, when obtaining the "damage features" (see FIG. 4), the first image feature obtaining unit 31B selectively obtains, from the first inspection result 13, the "damage features" of the damage portion of the damage D specified in the specification operation accepted by the acceptance unit 45. Accordingly, the first image feature obtaining unit 31B obtains the first image feature F1 that includes the features of the damage portion of the damage D specified in the specification operation described above and outputs the first image feature F1 to the retrieval unit 32. The configuration related to the subsequent process is basically the same as that of the first embodiment.

Operations of Inspection Result Retrieval Device according to Third Embodiment

Figure 15:
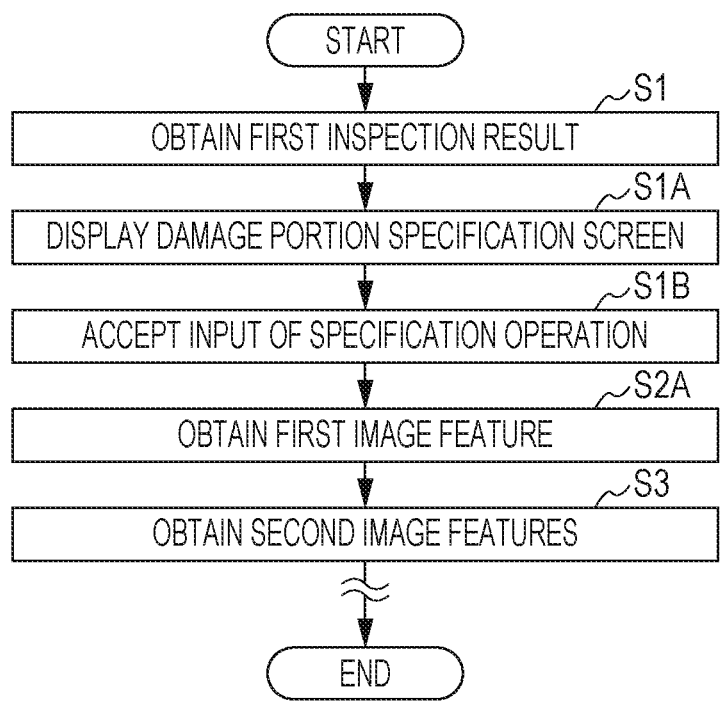
FIG. 15 is a flowchart illustrating a flow of a retrieval process performed by the inspection result retrieval device according to the third embodiment.

Now, operations of the inspection result retrieval device 10B according to the third embodiment are described with reference to FIG. 15. FIG. 15 is a flowchart illustrating a flow of a retrieval process performed by the inspection result retrieval device 10B according to the third embodiment. Note that the flow of the process up to step S1 is the same as that in the first embodiment illustrated in FIG. 9 described above, and therefore, a specific description thereof is omitted here.

After the process in step S1, the display control unit 34B obtains the inspection image data 27 included in the first inspection result 13 from the inspection result obtaining unit 30 and causes the display unit 20 to preliminarily display the damage portion specification screen 46 illustrated in FIG. 14 described above on the basis of the obtained inspection image data 27 (step S1A).

A person in charge of retrieval checks the displayed damage portion specification screen 46 and positions the cursor 47 on a specific damage portion of the damage D in the inspection image data 27 by operating the operation unit 21, and thereafter, performs a specification operation of specifying the damage portion of the damage D. Accordingly, the acceptance unit 45 accepts input of the specification operation from the operation unit 21 and outputs the input result of the specification operation to the first image feature obtaining unit 31B (step S1B).

When accepting the input result of the specification operation, the first image feature obtaining unit 31B obtains the first image feature F1 that includes the features of the damage portion of the damage D specified in the previously performed specification operation as the features of the damage D from the first inspection result 13 obtained by the inspection result obtaining unit 30 and outputs the first image feature F1 to the retrieval unit 32 (step S2A). Accordingly, the first image feature F1 that corresponds to the "damage features" (see FIG. 4) of a type of the damage D specified in a specification operation among a plurality of types of the damage D that may occur in the construction 9 is output to the retrieval unit 32.

Note that the process in step S3 and the subsequent steps are the same as that in the first embodiment illustrated in FIG. 9 described above, and therefore, a specific description thereof is omitted here.

Effects of Third Embodiment

As described above, the inspection result retrieval device 10B according to the third embodiment enables specification of a type of the damage D in the inspection image data 27 included in the first inspection result 13, the type of the damage D being used as a search condition of the first retrieval process. Accordingly, the specific inspection results 17A suitable for predicting the development of a type of the damage D specified in a specification operation among a plurality of types of the damage D having occurred in the construction 9 can be retrieved from the database 15 and displayed on the display unit 20. As a consequence, the development of a specific type of the damage D among a plurality of types of the damage D having occurred in the construction 9 can be predicted with high accuracy.

Modification of Third Embodiment

Note that, also in the inspection result retrieval device 10A according to the second embodiment described above, a damage portion of the damage D in the inspection image data 27 included in the first inspection result 13, the damage portion being used as a search condition of the first retrieval process, may be specified and the first image feature F1 that includes the features of the specified damage portion of the damage D may be obtained, as in the third embodiment described above.

Inspection Result Retrieval Device according to Fourth Embodiment

Figure 16:
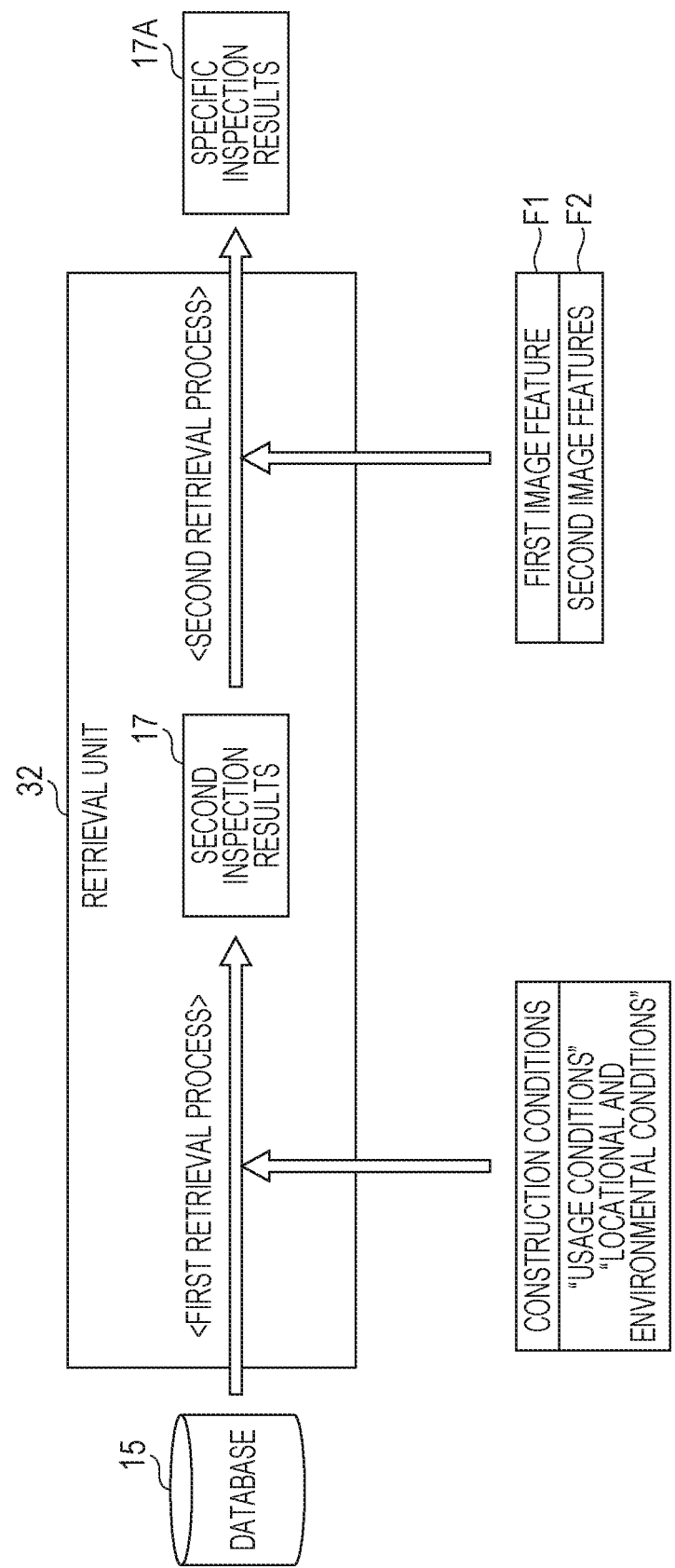
FIG. 16 is an explanatory diagram for explaining a retrieval process performed by an inspection result retrieval device according to a fourth embodiment.

Now, an inspection result retrieval device according to a fourth embodiment is described with reference to FIG. 16. FIG. 16 is an explanatory diagram for explaining a retrieval process performed by the inspection result retrieval device according to the fourth embodiment. The inspection result retrieval device according to the fourth embodiment has basically the same configuration as that of the inspection result retrieval device 10 according to the first embodiment (see FIG. 4) except for a different retrieval process method for the retrieval unit 32. Therefore, constituent elements having the same functions and configurations as those in the first embodiment described above are assigned the same reference numerals, and descriptions thereof are omitted.

The retrieval unit 32 according to the first to third embodiments described above first performs the first retrieval process for retrieving, from the database 15, the second inspection results 17 that each include the inspection image data 27 having the second image feature F2 that corresponds to the first image feature F1 obtained from the inspection image data 27 included in the first inspection result 13. Subsequently, the retrieval unit 32 according to the first to third embodiments described above performs the second retrieval process for retrieving the specific inspection results 17A that correspond to the "construction conditions", which include at least either the "usage conditions" or the "locational and environmental conditions", from among the second inspection results 17 retrieved in the first retrieval process.

Meanwhile, the retrieval unit 32 of the inspection result retrieval device according to the fourth embodiment first performs, as the first retrieval process, a process for retrieving the second inspection results 17 that correspond to the "construction conditions", which include at least either the "usage conditions" or the "locational and environmental conditions", included in the first inspection result 13 from among the second inspection results 17 stored in the database 15.

Subsequently, the retrieval unit 32 according to the fourth embodiment performs, as the second retrieval process, a process for retrieving the specific inspection results 17A that each include the inspection image data 27 having the second image feature F2 that corresponds to the first image feature F1 described above from among the second inspection results 17 retrieved in the first retrieval process. Note that the second image feature obtaining unit 33 according to the fourth embodiment (see FIG. 4) obtains the second image feature F2 from the inspection image data 27 included in each of the second inspection results 17 retrieved in the first retrieval process.

As described above, the retrieval unit 32 according to the fourth embodiment first performs, as the first retrieval process, the second retrieval process that is performed by the retrieval unit 32 according to the first to third embodiments described above, and thereafter, performs, as the second retrieval process, the first retrieval process that is performed by the retrieval unit 32 according to the first to third embodiments described above. That is, the retrieval unit 32 according to the fourth embodiment selects the second inspection results 17 from among the second inspection results 17 stored in the database 15 on the basis of the "construction conditions" among the "construction conditions" and the "first image feature F1", and thereafter, performs time-consuming retrieval based on the first image feature F1. Accordingly, the retrieval time can be made shorter than that in the first to third embodiments described above.

Note that a flow of the retrieval process performed by the inspection result retrieval device according to the fourth embodiment is basically the same as that illustrated by the flowchart in FIG. 9 according to the first embodiment described above except for the details of the first retrieval process and the details of the second retrieval process being flipped, and therefore, a specific description thereof is omitted here.

Inspection Result Retrieval Device according to Fifth Embodiment

Now, an inspection result retrieval device according to a fifth embodiment of the present invention is described. In the fifth embodiment, in a case where a user selects the second inspection result 17 (including the specific inspection result 17A in the fifth embodiment) that is a desired one on the retrieval result display screen 38 (see FIG. 7) displayed on the display unit 20, the inspection history of the construction 9 (hereinafter referred to as the specific construction 9) that is the inspection target in the selected second inspection result 17 is displayed on the display unit 20. Note that the inspection result retrieval device according to the fifth embodiment has basically the same configuration as that of the inspection result retrieval device 10 according to the first embodiment (see FIG. 4) except for the inspection history of the specific construction 9 being displayed. Therefore, constituent elements having the same functions and configurations as those in the first embodiment described above are assigned the same reference numerals, and descriptions thereof are omitted.

Figure 17:
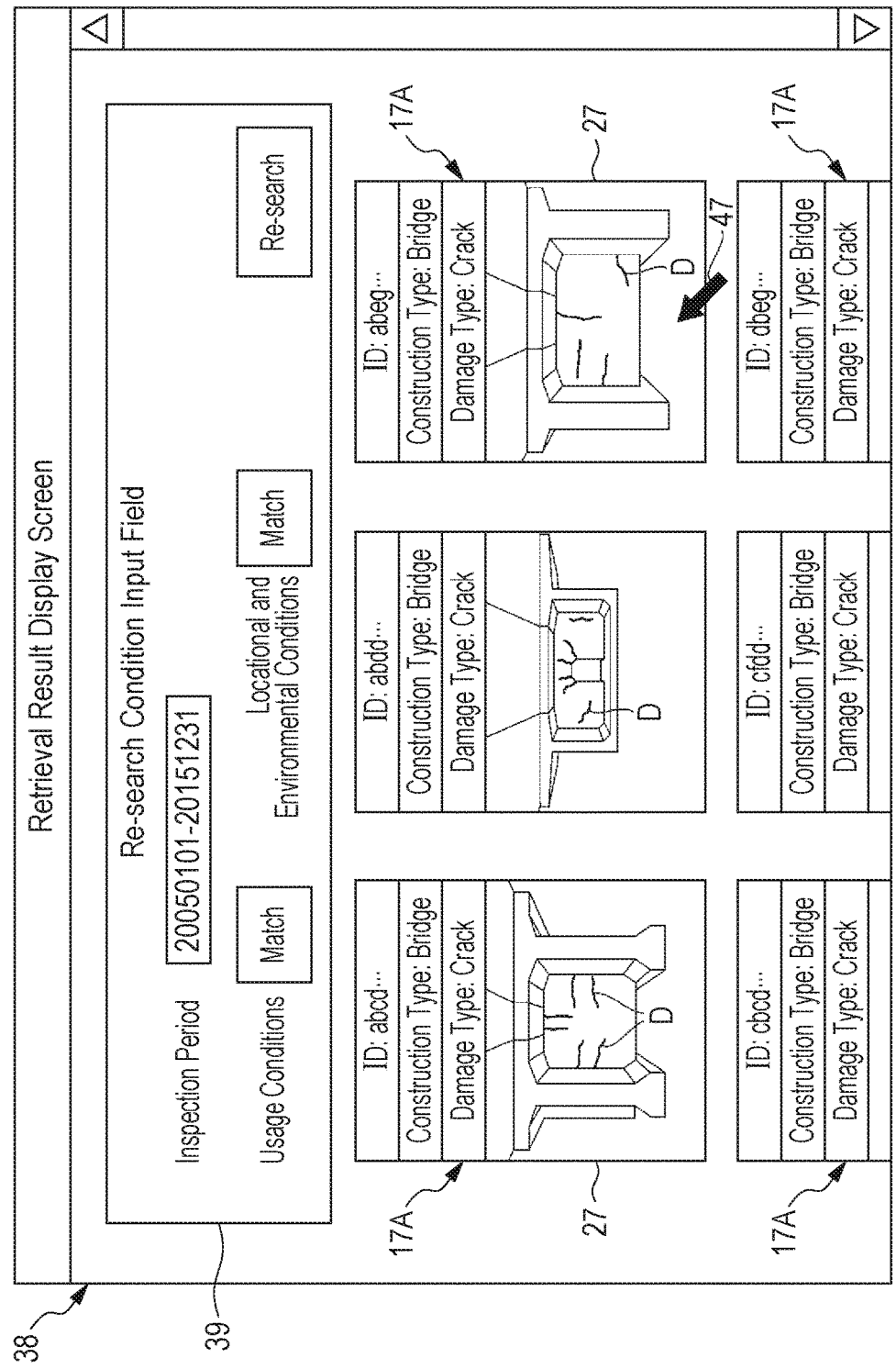
FIG. 17 is a front view of an example of the retrieval result display screen displayed on the display unit according to a fifth embodiment.
Figure 18:
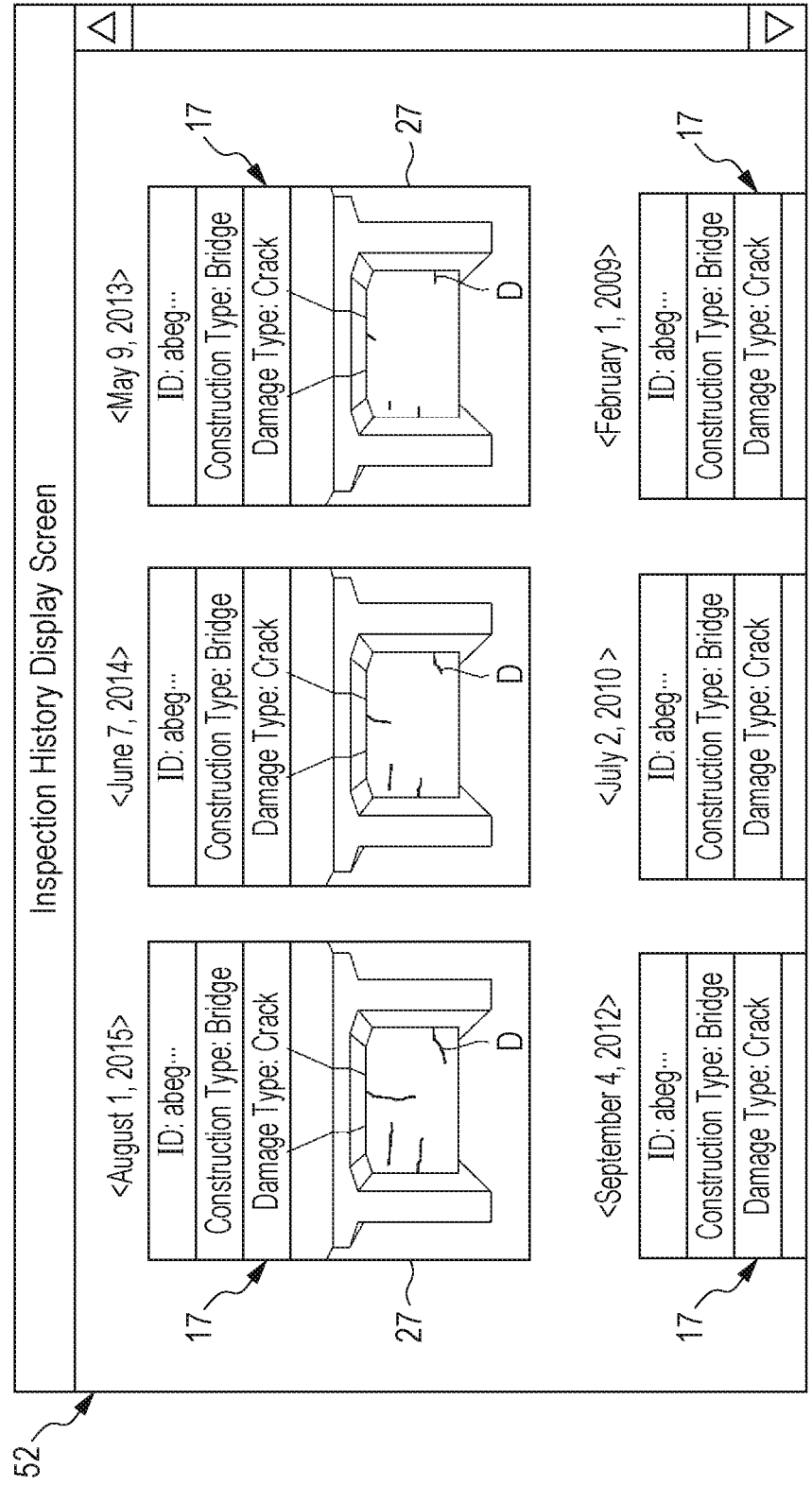
FIG. 18 is a front view of an example of an inspection history display screen displayed on the display unit and indicating the inspection history of a specific construction according to the fifth embodiment.

FIG. 17 is a front view of an example of the retrieval result display screen 38 displayed on the display unit 20 according to the fifth embodiment. FIG. 18 is a front view of an example of an inspection history display screen 52 displayed on the display unit 20 and indicating the inspection history of the specific construction 9 according to the fifth embodiment.

As illustrated in FIG. 17, in a case where the retrieval result display screen 38 is displayed on the display unit 20 and a selection operation of selecting one of the second inspection results 17 (including the specific inspection results 17A) on the retrieval result display screen 38 with, for example, the cursor 47 is accepted, the retrieval unit 32 according to the fifth embodiment accesses the database 15 and starts retrieving the second inspection results 17. Specifically, the retrieval unit 32 retrieves the second inspection results 17 that correspond to the specific construction 9 that is the inspection target in the second inspection result 17 selected in the selection operation from the database 15 and outputs the retrieval results to the display control unit 34. Note that the method for the selection operation is not limited to the method for selection using the cursor 47, and various methods including a method using, for example, a touch operation may be used.

As illustrated in FIG. 18, the display control unit 34 according to the fifth embodiment generates the inspection history display screen 52 that includes the second inspection results 17 regarding the specific construction 9 retrieved by the retrieval unit 32 in accordance with the selection operation described above and causes the display unit 20 to display the inspection history display screen 52. Accordingly, the user can check the inspection history (the past second inspection results 17) of the specific construction 9 that corresponds to the second inspection result 17 selected on the retrieval result display screen 38.

Note that, in the fifth embodiment, the inspection history display screen 52 that indicates the inspection history of the specific construction 9 is displayed on the display unit 20; however, the inspection history of the construction 9 that is the inspection target in the first inspection result 13 described above may also be displayed on the display unit 20. In this case, when retrieving the second inspection results 17 that correspond to the specific construction 9 from the database 15, the retrieval unit 32 also retrieves the second inspection results 17 that correspond to the construction 9 that is the inspection target in the first inspection result 13 from the database 15. Then, the retrieval unit 32 outputs the second inspection results 17 regarding the specific construction 9 and the second inspection results 17 regarding the construction 9 that is the inspection target in the first inspection result 13 to the display control unit 34.

The display control unit 34 generates, on the basis of the second inspection results 17 regarding the specific construction 9 input from the retrieval unit 32 and the second inspection results 17 regarding the construction 9 that is the inspection target in the first inspection result 13, an inspection history display screen 54 (see FIG. 19) that indicates the inspection histories of both the constructions 9 and causes the display unit 20 to display the inspection history display screen 54.

Figure 19:
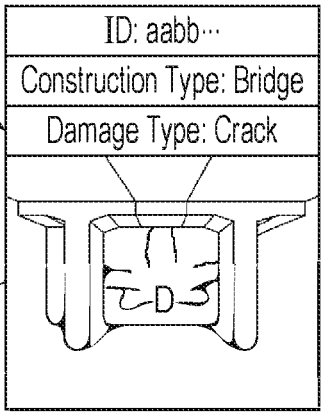
FIG. 19 is a front view of an inspection history display screen displayed on the display unit and different from that illustrated in FIG. 18 according to the fifth embodiment.

FIG. 19 is a front view of the inspection history display screen 54 displayed on the display unit 20 according to the fifth embodiment. As illustrated in FIG. 19, on the inspection history display screen 54, the inspection history (the second inspection results 17) of the construction 9 that is the inspection target in the first inspection result 13 and the inspection history (the second inspection results 17) of the specific construction 9 are displayed so as to enable a comparison. When the inspection histories of both the constructions 9 are displayed so as to enable a comparison, the development of the damage D having occurred in the construction 9 that is the inspection target in the first inspection result 13 can be predicted with high accuracy. As a consequence, the severity of the damage D that has occurred in the construction 9 can be determined, and furthermore, the time when the damage D of the construction 9 needs to be repaired can be appropriately determined.

Others

The inspection result obtaining unit 30 according to the embodiments described above obtains the first inspection result 13 from the image capturing terminal 12; however, the inspection result obtaining unit 30 may obtain the first inspection result 13 from a server or a database on the Internet or from an information recording media of any type, such as a memory card. Further, the inspection result obtaining unit 30 may obtain one of the second inspection results 17, which are past inspection results, stored in, for example, the database 15 described above as a new first inspection result 13 and perform the retrieval described above. Accordingly, the development of the damage D having occurred in the construction 9 that has been inspected in the past can be predicted.

In the embodiments described above, the database 15 is provided separately from the inspection result retrieval device 10, 10A, or 10B; however, the database 15 may be built in the inspection result retrieval device 10, 10A, or 10B.

On the retrieval result display screen 38 according to the embodiments described above, the display form in which the specific inspection results 17A and the second inspection results 17 are arranged side by side is employed; however, the display form for the specific inspection results 17A and the second inspection results 17 is not specifically limited, and various display forms can be employed. Also in this case, the specific inspection results 17A are displayed preferentially over the second inspection results 17 (for example, the specific inspection results 17A precede the second inspection results 17 in the order of display).

In the embodiments described above, as an example of the "priority display" in which the specific inspection results 17A are displayed preferentially over the second inspection results 17, the case where the specific inspection results 17A precede the second inspection results 17 in the order of display on the display unit 20 has been described; however, the "priority display" may be performed using other methods. The display form for the specific inspection results 17A may be made different from that for the other second inspection results 17 by, for example, making the specific inspection results 17A larger than the other second inspection results 17 and displaying the specific inspection results 17A, highlighting and displaying the specific inspection results 17A, or marking or coloring and displaying the specific inspection results 17A to thereby "display" the specific inspection results 17A "preferentially" over the second inspection results 17. Alternatively, the display positions may be changed by, for example, displaying the specific inspection results 17A in a prominent location, such as a center portion, on a screen of the display unit 20 and displaying the other second inspection results 17 in an edge portion of the screen to thereby "display" the specific inspection results 17A "preferentially" over the second inspection results 17.

A program for causing a computer to function as the inspection result retrieval device described in each of the embodiments described above can be recorded to a CD-ROM (compact disc read-only memory), a magnetic disk, or another computer-readable medium (tangible non-transitory information storage medium) and provided from the information storage medium. Instead of storing the program in the information storage medium and providing the program from the information storage medium, a communication network, such as the Internet, can be used and the program can be provided as a download service. Reference Signs List 9 . . . construction, 10, 10A, 10B . . . inspection result retrieval device, 12 . . . image capturing terminal, 13 . . . first inspection result, 15 . . . database, 17 . . . second inspection result, 17A . . . specific inspection result, 20 . . . display unit, 27 . . . inspection image data, 30 . . . inspection result obtaining unit, 31, 31B . . . first image feature obtaining unit, 32 . . . retrieval unit, 33 . . . second image feature obtaining unit, 34, 34A, 34B . . . display control unit, 38 . . . retrieval result display screen, 41 . . . image processing unit, 43 . . . comparison display screen, 45 . . . acceptance unit, 46 . . . damage portion specification screen

What is claimed is:

1. An inspection result retrieval device comprising:
an inspection result obtaining processor that obtains a first inspection result regarding a construction, the first inspection result including a usage condition and a locational and environmental condition of the construction and an inspection image of an inspection portion of the construction;
a first image feature obtaining processor that obtains an image feature of the inspection image from the first inspection result obtained by the inspection result obtaining processor, the image feature including at least a damage feature, which is a feature of damage that has occurred in the inspection portion;
a retrieval processor that retrieves, from a database storing a plurality of second inspection results regarding a plurality of constructions, the plurality of second inspection results each including the usage condition, the locational and environmental condition, and the inspection image, one or more second inspection results among the plurality of second inspection results, the one or more second inspection results corresponding to one of the image feature obtained by the first image feature obtaining processor or a construction condition that includes at least one of the usage condition or the locational and environmental condition included in the first inspection result; and
a display control processor that causes a display to display the one or more second inspection results retrieved by the retrieval processor, wherein
the retrieval processor tries to retrieve one or more specific inspection results that correspond to the other of the image feature or the construction condition from among the retrieved one or more second inspection results,
in a case where a retrieval result obtained by the retrieval processor trying to retrieve the one or more specific inspection results includes the one or more specific inspection results, the display control processor causes the display to display the one or more specific inspection results preferentially over other inspection results among the one or more second inspection results retrieved by the retrieval processor,
the retrieval processor has a second image feature obtaining processor that obtains the image feature of the inspection image included in each of the plurality of second inspection results and, in a case of retrieval of the one or more second inspection results or the one or more specific inspection results corresponding to the image feature obtained by the first image feature obtaining processor, performs the retrieval using the image feature obtained by the second image feature obtaining processor to,
the first inspection result and the plurality of second inspection results each include identification information with which the construction that is an inspection target is identifiable,
the display control processor has a comparison display mode in which, in a case where it is determined, on the basis of the identification information included in the first inspection result and the identification information included in each of the one or more second inspection results retrieved by the retrieval processor, that a retrieval result obtained by the retrieval processor includes a second inspection result that is a result of inspection of the same construction for which the first inspection result is obtained, the display control processor causes the display to display both the inspection image included in the first inspection result and the inspection image included in the second inspection result, and the inspection result retrieval device further comprises an image processing processor that performs, for at least one of the inspection image included in the first inspection result or the inspection image included in the second inspection result, image processing for matching a shape and position of the construction in the inspection image included in the first inspection result and a shape and position of the construction in the inspection image included in the second inspection result to be displayed on the display in the comparison display mode on the basis of a feature other than the damage feature included in the image feature obtained by the first image feature obtaining processor and in the image feature obtained by the second image feature obtaining processor.

2. The inspection result retrieval device according to claim 1, wherein the display control processor performs preliminary display in which the display control processor causes the display to display the inspection image included in the first inspection result obtained by the inspection result obtaining processor before the first image feature obtaining processor obtains the image feature, the inspection result retrieval device further comprises an acceptance processor that, in a case where a specification operation of specifying a damage portion of the damage in the inspection image preliminarily displayed on the display is performed, accepts input of the specification operation, and the first image feature obtaining processor obtains the image feature that includes the damage feature of the damage portion of the damage specified in the specification operation accepted by the acceptance processor from the inspection image.

3. The inspection result retrieval device according to claim 2, wherein the damage feature includes at least one of a position of the damage in the inspection portion, a type of the damage, or a shape and size of the damage.

4. The inspection result retrieval device according to claim 3, wherein in a case where a selection operation of selecting a second inspection result from among the one or more second inspection results displayed by the display is accepted, the retrieval processor retrieves, from the database, one or more second inspection results that correspond to a specific construction that is an inspection target in the second inspection result selected in the selection operation, and the display control processor causes the display to display, as an inspection history of the specific construction, the one or more second inspection results regarding the specific construction retrieved by the retrieval processor in accordance with the selection operation.

5. The inspection result retrieval device according to claim 4, wherein in a case of retrieving the one or more second inspection results that correspond to the specific construction, the retrieval processor retrieves, from the database, one or more second inspection results that correspond to the construction that is an inspection target in the first inspection result, and the display control processor causes the display to display the one or more second inspection results regarding the specific construction retrieved by the retrieval processor and the one or more second inspection results regarding the construction that is an inspection target in the first inspection result.

6. The inspection result retrieval device according to claim 2, wherein in a case where a selection operation of selecting a second inspection result from among the one or more second inspection results displayed by the display is accepted, the retrieval processor retrieves, from the database, one or more second inspection results that correspond to a specific construction that is an inspection target in the second inspection result selected in the selection operation, and the display control processor causes the display to display, as an inspection history of the specific construction, the one or more second inspection results regarding the specific construction retrieved by the retrieval processor in accordance with the selection operation.

7. The inspection result retrieval device according to claim 6, wherein in a case of retrieving the one or more second inspection results that correspond to the specific construction, the retrieval processor retrieves, from the database, one or more second inspection results that correspond to the construction that is an inspection target in the first inspection result, and the display control processor causes the display to display the one or more second inspection results regarding the specific construction retrieved by the retrieval processor and the one or more second inspection results regarding the construction that is an inspection target in the first inspection result.

8. The inspection result retrieval device according to claim 1, wherein the damage feature includes at least one of a position of the damage in the inspection portion, a type of the damage, or a shape and size of the damage.

9. The inspection result retrieval device according to claim 8, wherein in a case where a selection operation of selecting a second inspection result from among the one or more second inspection results displayed by the display is accepted, the retrieval processor retrieves, from the database, one or more second inspection results that correspond to a specific construction that is an inspection target in the second inspection result selected in the selection operation, and the display control processor causes the display to display, as an inspection history of the specific construction, the one or more second inspection results regarding the specific construction retrieved by the retrieval processor in accordance with the selection operation.

10. The inspection result retrieval device according to claim 9, wherein in a case of retrieving the one or more second inspection results that correspond to the specific construction, the retrieval processor retrieves, from the database, one or more second inspection results that correspond to the construction that is an inspection target in the first inspection result, and the display control processor causes the display to display the one or more second inspection results regarding the specific construction retrieved by the retrieval processor and the one or more second inspection results regarding the construction that is an inspection target in the first inspection result.

11. The inspection result retrieval device according to claim 1, wherein in a case where a selection operation of selecting a second inspection result from among the one or more second inspection results displayed by the display is accepted, the retrieval processor retrieves, from the database, one or more second inspection results that correspond to a specific construction that is an inspection target in the second inspection result selected in the selection operation, and the display control processor causes the display to display, as an inspection history of the specific construction, the one or more second inspection results regarding the specific construction retrieved by the retrieval processor in accordance with the selection operation.

12. The inspection result retrieval device according to claim 11, wherein in a case of retrieving the one or more second inspection results that correspond to the specific construction, the retrieval processor retrieves, from the database, one or more second inspection results that correspond to the construction that is an inspection target in the first inspection result, and the display control processor causes the display to display the one or more second inspection results regarding the specific construction retrieved by the retrieval processor and the one or more second inspection results regarding the construction that is an inspection target in the first inspection result.

13. An inspection result retrieval method comprising:

an inspection result obtaining step of obtaining a first inspection result regarding a construction, the first inspection result including a usage condition and a locational and environmental condition of the construction and an inspection image of an inspection portion of the construction;

a first image feature obtaining step of obtaining an image feature of the inspection image from the first inspection result obtained in the inspection result obtaining step, the image feature including at least a damage feature, which is a feature of damage that has occurred in the inspection portion;

a retrieval step of retrieving, from a database storing a plurality of second inspection results regarding a plurality of constructions, the plurality of second inspection results each including the usage condition, the locational and environmental condition, and the inspection image, one or more second inspection results among the plurality of second inspection results, the one or more second inspection results corresponding to one of the image feature obtained in the first image feature obtaining step or a construction condition that includes at least one of the usage condition or the locational and environmental condition; and a display control step of causing a display to display the one or more second inspection results retrieved in the retrieval step, wherein the retrieval step includes trying to retrieve one or more specific inspection results that correspond to the other of the image feature or the construction condition from among the retrieved one or more second inspection results, in a case where a retrieval result obtained in the retrieval step trying to retrieve the one or more specific inspection results includes the one or more specific inspection results, the display control step includes causing the display to display the one or more specific inspection results preferentially over other inspection results among the one or more second inspection results retrieved in the retrieval step, the retrieval step has a second image feature obtaining step that obtains the image feature of the inspection image included in each of the plurality of second inspection results and, in a case of retrieval of the one or more second inspection results or the one or more specific inspection results corresponding to the image feature obtained by the first image feature obtaining step, performs the retrieval using the image feature obtained by the second image feature obtaining step, the first inspection result and the plurality of second inspection results each include identification information with which the construction that is an inspection target is identifiable, in a case where it is determined, on the basis of the identification information included in the first inspection result and the identification information included in each of the one or more second inspection results retrieved by the retrieval step, that a retrieval result obtained by the retrieval step includes a second inspection result that is a result of inspection of the same construction for which the first inspection result is obtained, the display control step has a comparison display step of causing the display to display both the inspection image included in the first inspection result and the inspection image included in the second inspection result, and the inspection result retrieval method further comprises an image processing step that performs, for at least one of the inspection image included in the first inspection result or the inspection image included in the second inspection result, image processing for matching a shape and position of the construction in the inspection image included in the first inspection result and a shape and position of the construction in the inspection image included in the second inspection result to be displayed on the display in the comparison display step on the basis of a feature other than the damage feature included in the image feature obtained by the first image feature obtaining step and in the image feature obtained by the second image feature obtaining step.

* * * * *